(12) United States Patent
Nikhara et al.

(10) Patent No.: US 10,949,700 B2
(45) Date of Patent: Mar. 16, 2021

(54) DEPTH BASED IMAGE SEARCHING

(71) Applicant: QUALCOMM Incorporated, San Diego, CA (US)

(72) Inventors: Soman Ganesh Nikhara, Hyderabad (IN); Bapineedu Chowdary Gummadi, Hyderabad (IN); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 15/867,493

(22) Filed: Jan. 10, 2018

(65) Prior Publication Data

US 2019/0213435 A1 Jul. 11, 2019

(51) Int. Cl.
| | | |
|---|---|---|
| G06K 9/46 | (2006.01) | |
| G06T 7/50 | (2017.01) | |
| G06K 9/38 | (2006.01) | |
| G06K 9/00 | (2006.01) | |

(52) U.S. Cl.
CPC ....... *G06K 9/4604* (2013.01); *G06K 9/00201* (2013.01); *G06K 9/38* (2013.01); *G06K 9/4642* (2013.01); *G06T 7/50* (2017.01); *G06T 2207/10028* (2013.01)

(58) Field of Classification Search
CPC ....... G06K 9/4604; G06K 9/4642; G06T 7/50
See application file for complete search history.

(56) References Cited

U.S. PATENT DOCUMENTS

| | | | | |
|---|---|---|---|---|
| 8,755,837 | B2 * | 6/2014 | Rhoads | G06K 9/00577 455/556.1 |
| 9,813,616 | B2 * | 11/2017 | Lelescu | G06T 3/4069 |
| 9,870,521 | B1 * | 1/2018 | Solh | G06K 9/6267 |
| 9,900,560 | B1 * | 2/2018 | Kirmani | G06K 9/00201 |
| 10,389,986 | B2 * | 8/2019 | Kirmani | H04N 7/181 |
| 2004/0125205 | A1 * | 7/2004 | Geng | G01B 11/2509 348/142 |
| 2011/0188773 | A1 * | 8/2011 | Wei | G06K 9/40 382/260 |
| 2012/0007939 | A1 * | 1/2012 | Michrowski | H04N 7/147 348/14.07 |
| 2012/0033876 | A1 * | 2/2012 | Momeyer | G06K 9/228 382/165 |
| 2012/0162396 | A1 * | 6/2012 | Huang | H04N 13/264 348/51 |
| 2013/0095920 | A1 * | 4/2013 | Patiejunas | G06T 15/00 463/31 |
| 2013/0106848 | A1 * | 5/2013 | Nguyen | G06T 15/205 345/419 |

(Continued)

OTHER PUBLICATIONS

Meyer G.P., et al., "Improving Face Detection with Depth" IEEE International Conference on Acoustics, Speech and Signal Processing, 2016, 5 Pages.

*Primary Examiner* — Mia M Thomas
(74) *Attorney, Agent, or Firm* — Holland & Hart LLP

(57) ABSTRACT

Among other things, the present disclosure relates to image searching. With a depth map, image pixels of an image having depth values intersecting a desired optical field can be identified. A territory can be set based on locations of the identified image pixels. Feature detection can be performed on the image within the set territory. The feature detection can be limited to the set territory.

26 Claims, 20 Drawing Sheets

(56) References Cited

U.S. PATENT DOCUMENTS

| | | | |
|---|---|---|---|
| 2013/0155050 A1* | 6/2013 | Rastogi | G06T 5/50 345/419 |
| 2013/0206967 A1* | 8/2013 | Shpunt | H01S 5/02288 250/216 |
| 2013/0286017 A1* | 10/2013 | Marimon Sanjuan | G06T 15/00 345/427 |
| 2014/0028804 A1* | 1/2014 | Usuda | G01C 11/06 348/47 |
| 2014/0267243 A1* | 9/2014 | Venkataraman | G06T 7/557 345/419 |
| 2014/0313290 A1* | 10/2014 | Tech | G06T 15/205 348/43 |
| 2015/0187082 A1* | 7/2015 | Bernal | G06K 9/4604 382/154 |
| 2015/0235408 A1* | 8/2015 | Gross | G06T 15/20 345/419 |
| 2015/0269740 A1* | 9/2015 | Mazurenko | G06K 9/00355 382/173 |
| 2015/0279043 A1* | 10/2015 | Bakhtiari | G06K 9/4642 382/195 |
| 2015/0326845 A1* | 11/2015 | Liang | G06T 7/11 382/154 |
| 2015/0363665 A1* | 12/2015 | Szasz | G06K 9/52 382/203 |
| 2016/0156899 A1* | 6/2016 | Higo | G01B 11/25 348/48 |
| 2016/0269526 A1* | 9/2016 | Posa | H04N 5/272 |
| 2016/0350585 A1* | 12/2016 | Lin | H04N 7/15 |
| 2017/0053183 A1* | 2/2017 | Matsuhashi | G06K 9/00993 |
| 2017/0223340 A1* | 8/2017 | Salvagnini | G01S 17/894 |
| 2017/0278251 A1 | 9/2017 | Peeper et al. | |
| 2017/0358094 A1* | 12/2017 | Sun | G06T 7/11 |
| 2018/0061069 A1* | 3/2018 | Higaki | G06T 5/50 |
| 2018/0082414 A1* | 3/2018 | Rozenberg | G06T 7/75 |
| 2018/0180408 A1* | 6/2018 | Du | G01B 11/25 |
| 2019/0082103 A1* | 3/2019 | Banerjee | G06T 3/4038 |
| 2019/0122082 A1* | 4/2019 | Cuban | H04N 21/25883 |

* cited by examiner

US 10,949,700 B2

DEPTH BASED IMAGE SEARCHING

BACKGROUND

Field of the Disclosure

The present disclosure relates to image searching.

Description of Related Art

Computing devices can be configured to detect features in images. A feature can be real and/or virtual. A real feature can be something that exists in the physical universe such as a person, a person's face, a facial expression, an animal, a car, etc. A virtual feature can be something that exists in image space such as an edge, an edge direction, a color, a color gradient, a relationship between edges, etc.

Feature detection can include feature extraction and feature classification. Feature extraction can include applying mathematical operators to images to reveal (e.g., identify) virtual features. Feature classification can include analyzing the extracted virtual features to determine (e.g., estimate) whether the virtual features represent a real feature.

Virtual features can be extracted from a certain region of interest (i.e., a preset area of the image). An example of feature extraction is applying a high pass filter to a region of an image to reveal edges. Another example of feature extraction is identifying edge direction and the distances between revealed edges.

A computing device can classify extracted features. For example, a computing device can analyze extracted edges to determine whether the extracted edges reflect (i.e., approximate) a real feature (e.g., a human face). Feature classification can occur in-parallel with feature extraction.

SUMMARY

A method can include: identifying, with a depth map, image pixels of an image having depth values intersecting a desired optical field; setting a territory based on locations of the identified image pixels; performing feature detection on the image within the set territory. The feature detection can be limited to the set territory. One or more processors can perform the method.

A processing system can include one or more processors configured to: identify, with a depth map, image pixels of an image having depth values intersecting a desired optical field; set a territory based on locations of the identified image pixels; perform feature detection on the image within the set territory. The one or more processors can be configured to limit the feature detection to the set territory.

A processing system can include: means for identifying, with a depth map, image pixels of an image having depth values intersecting a desired optical field; means for setting a territory based on locations of the identified image pixels; means for performing feature detection on the image within the set territory such that the feature detection is limited to the set territory.

A non-transitory computer-readable medium can include program code, which, when executed by one or more processors, causes the one or more processors to perform operations. The program code can include code for: identifying, with a depth map, image pixels of an image having depth values intersecting a desired optical field; setting a territory based on locations of the identified image pixels; performing feature detection on the image within the set territory such that the feature detection is limited to the set territory.

BRIEF DESCRIPTION OF THE DRAWINGS

The above summary and the below detailed description of illustrative embodiments may be better understood when read in conjunction with the appended Figures. The Figures show some of the illustrative embodiments discussed herein. As further explained below, the claims are not limited to the illustrative embodiments. For clarity and ease of reading, some Figures omit views of certain features. Unless expressly stated otherwise, the Figures are not to scale and features are shown schematically.

DETAILED DESCRIPTION

I

The present application includes illustrative embodiments. The claims are not limited to the illustrative embodiments. Therefore, some claimed implementations will have different features than in the illustrative embodiments. Changes can be made without departing from the spirit of the disclosure. For example, features of the illustrative embodiments can be incorporated in different systems (e.g., devices) and methods. The claims are intended to cover implementations with such changes.

At times, the present application uses relative terms (e.g., front, back, top, bottom, left, right, etc.) to give the reader context when viewing the Figures. Relative terms do not limit the claims. Any relative term can be replaced with a numbered term (e.g., left can be replaced with first, right can be replaced with second, and so on).

The present application includes Roman numeral headings. The headings are only for the reader's convenience. The headings do not have underlying significance. The present application should be interpreted as if the headings were absent.

II

Figure 1:
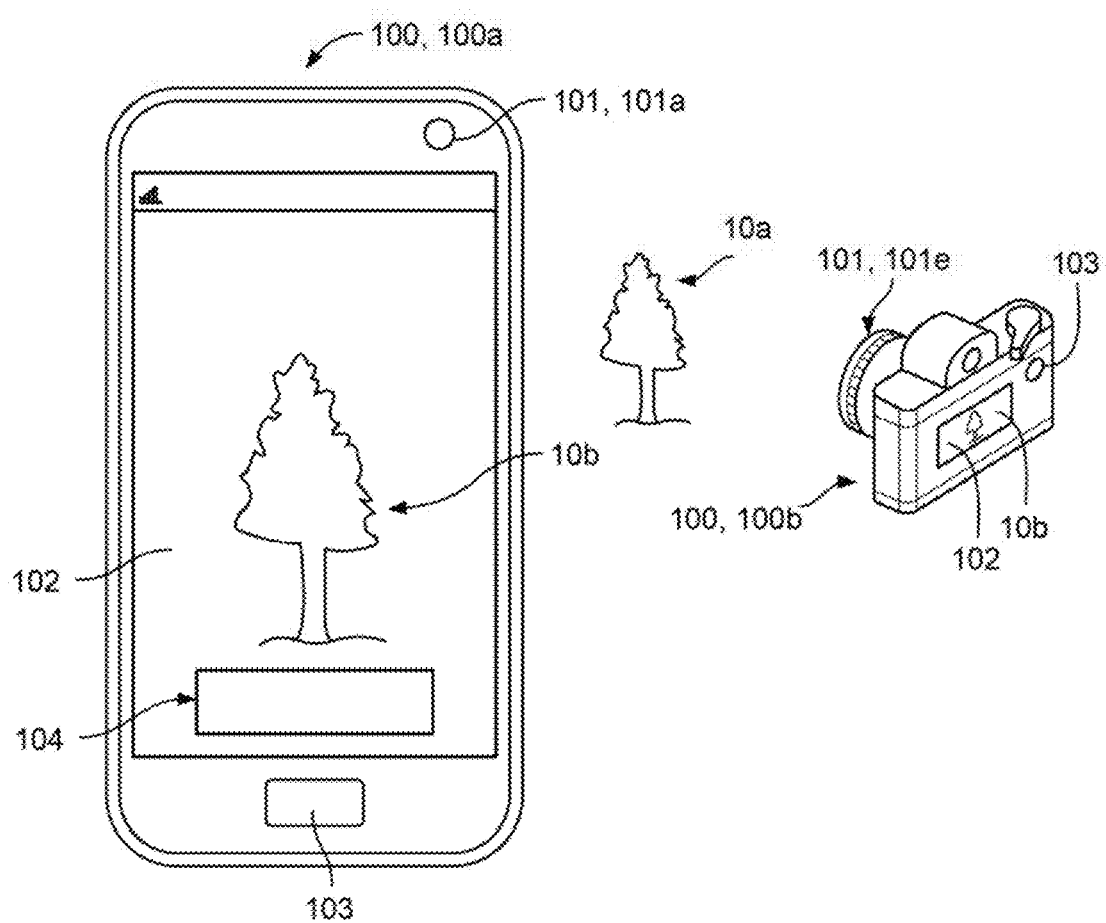
FIG. 1 shows example mobile devices imaging a scene.
Figure 2:
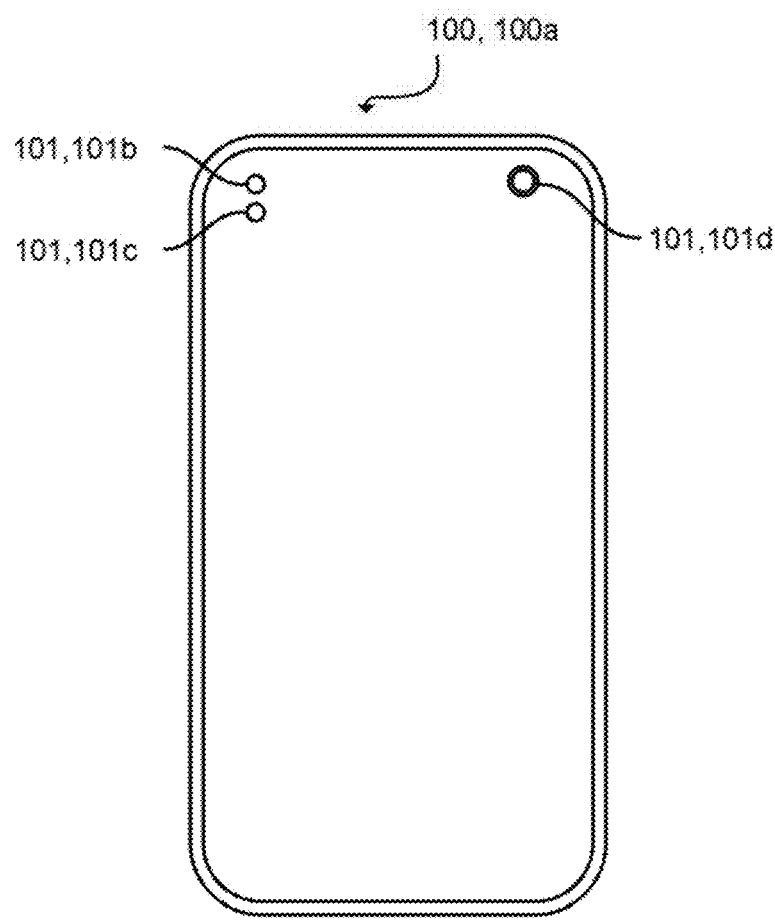
FIG. 2 shows a rear of an example mobile device.

FIG. 1 shows mobile devices 100 imaging a scene 10a. Mobile device 100 can be a smartphone 100a or a dedicated camera assembly 100b. FIG. 2 shows a rear of smartphone 100a. Mobile device 100 can include a processing system 400 (schematically shown in FIG. 4). Processing system 400 can include one or more cameras 101 (also called optical sensors, image sensors, and the like).

Processing system 400 of smartphone 100a can include cameras 101a-101d. Processing system 400 of dedicated camera assembly 100b can include camera 101e. Besides cameras 101, mobile device 100 can include a frame (not labeled), a display 102, hard buttons 103. Processing system 400 can be configured to present soft or virtual buttons 104 on display 102.

As used herein, a "camera" can be any kind of digital image sensor. Therefore, the term "camera" encompasses digital image sensors of dedicated camera assemblies 100b and digital image sensors mounted to any kind of device (e.g., a smartphone 100a, a vehicle, etc.).

Processing system 400 can be configured to enter a viewfinder mode. During viewfinder mode, processing system 400 can present a stream of full-channel images (e.g., samples of full-channel images) on display 102. When the user presses a button 103, 104, processing system 400 can be configured to preserve a stable image in memory.

Processing system 400 can preserve the stable image in memory indefinitely (e.g., in non-volatile memory, which can be local or remote (e.g., in a cloud)). The capture button can cause mobile device 100 to record a single image or a plurality of images, which represent frames of a video. Stable images are further discussed below.

Figure 3:
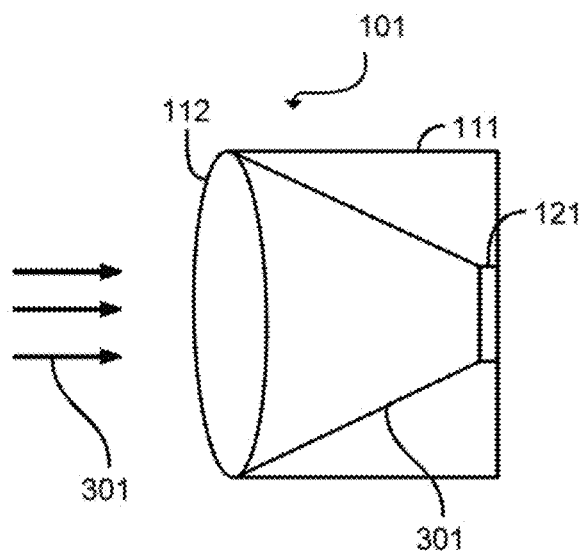
FIG. 3 shows a cross-sectional plan view of an example camera.

FIG. 3 is a simplified schematic view of camera 101 (also called an image sensor package), which can be mounted in mobile device 100, or any other kind of system (e.g., a vehicle). Camera 101 can be representative of some or all of cameras 101a-101e shown in FIGS. 1 and 2.

Camera 101 can include a housing 111 retaining a lens 112 and a sensor panel 121 (also called a photosensor and an image sensor). As shown in FIG. 3, lens 112 can admit light 301 from a scene (e.g., scene 10a), and output converged light 301, which sensor panel 121 can measure with sensor pixels (discussed below).

A first portion of converged light 301 can be in-focus (e.g., substantially in-focus) on sensor panel 121. Therefore, the first portion of light 301 can represent the field of focus. The remainder of converged light 301 can be out-of-focus on sensor panel 121.

Although not shown, camera 101 can include a plurality of lenses and other optical elements such as traditional apertures, shutters, mirrors, and the like. Camera 101 can include an actuator configured to move at least one lens. The actuator can be a motor. The actuator can move the lens in response to an autofocus command. Mobile device 100 can issue an autofocus command based on data obtained from phase detection pixels, as is known in the art.

Figure 4:
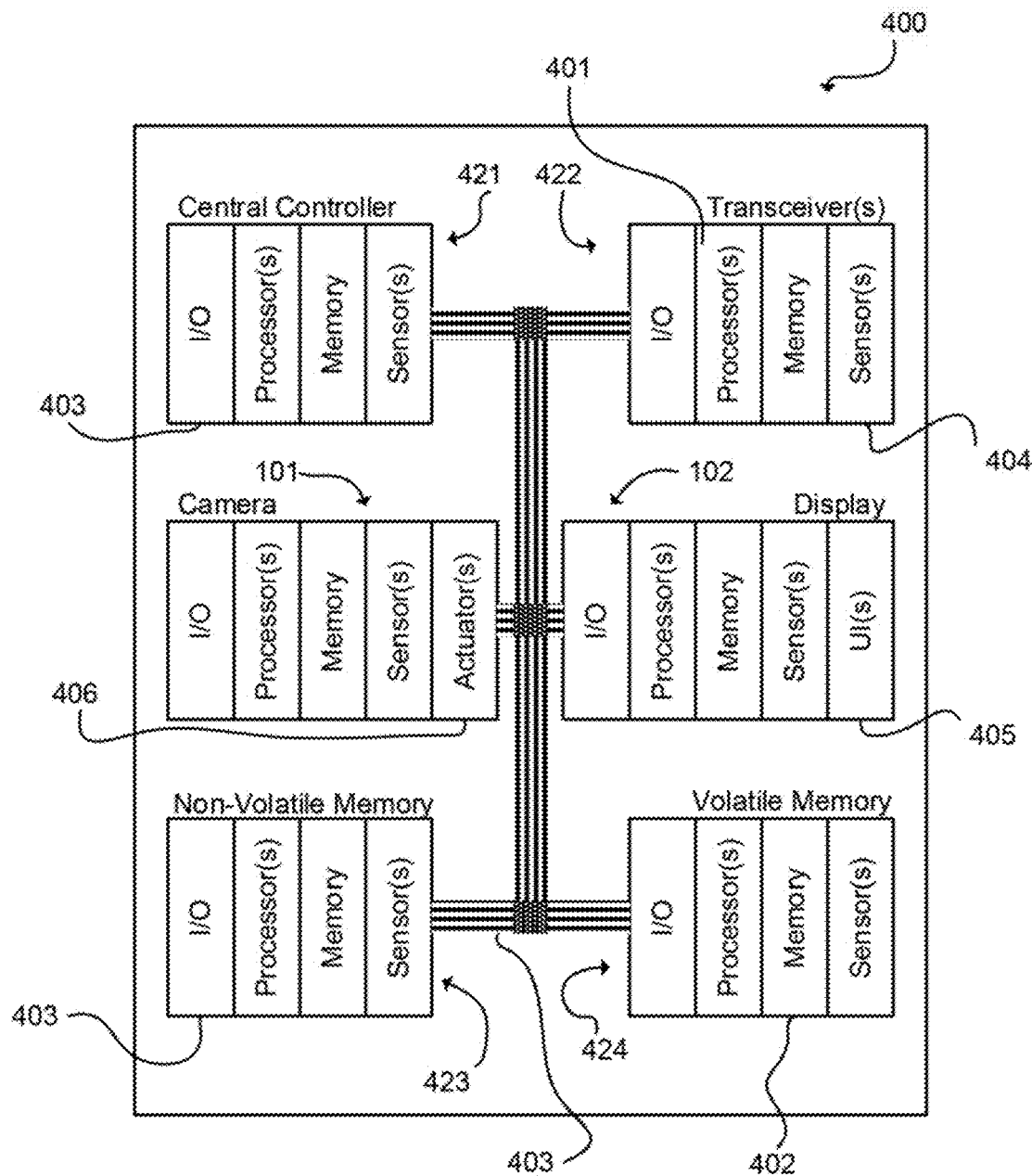
FIG. 4 is a block diagram of an example processing system.

Referring to FIG. 4, and as further addressed below processing system 400 can include one or more processors 401 and memory 402. According to some examples, camera(s) 101, display 102, and hard buttons 103 are aspects of processing system 400. Processing system 400 can be configured to perform some or all of the functions, operations, and methods discussed in the present application. Processing system 400 can be present in any kind of device (e.g., a vehicle, a desktop computer, etc.). Processing system 400 can be an aspect of mobile device 100. According to some examples, processing system 400 is distributed across a plurality of computing devices.

As further addressed below, processing system 400 can be configured to (a) capture an image mosaic, (b) prepare a full-channel image with the image mosaic, and (c) prepare a 3D map (e.g., a phase disparity depth map) with the image mosaic. Processing system 400 can be configured to perform feature detection on the full-channel image (or any other image stage, such as a mosaic) based on the 3D map. For example, processing system 400 can isolate a territory of the full-channel image based on the 3D map. The territory can encompass a predetermined optical field (e.g., 0-3 m from camera 101).

Processing system 400 can confine feature detection to the territory. If predetermined ending conditions are satisfied during feature detection in the territory, then processing system 400 can conclude feature detection in the full-channel image. If the predetermined ending conditions are not satisfied, then processing system 400 can select a new territory and perform feature detection in the new territory. This cycle can continue until the entire image has been searched or predetermined ending conditions have been satisfied. As an example, processing system 400 can conclude feature detection when a predetermined number of human faces have been identified.

The depth range of the first isolated territory can be user-selected and/or automatically selected. The depth range can be selected to encompass foreground. The depth range can be selected to encompass field of focus (although field of focus can overlap and/or be coextensive with foreground).

Camera 101 can build a 3D depth map with any suitable technique. Techniques can include applying a stereoscopic image pair (e.g., imaging a scene with two or more cameras), rangefinding (e.g., imaging a scene with an infrared rangefinder), and/or applying one or more cameras 101 equipped with phase detection. Examples of phase detection equipped cameras 101 are discussed below.

III

Referring to FIGS. 3 and 5-7 sensor panel 121 can include a plurality of sensor pixels 501. Each sensor pixel 501 can include a spectral filter (shown in FIGS. 5-7), and one or more photodiodes (not shown) configured to receive light passed through the filter. Spectral filters are also known as color filters. Sensor pixels 501 can include other features.

For example, each sensor pixel 501 can include a common microlens configured to converge light onto the photodiode(s) of the sensor pixel 501 and/or shielding applied over the photodiode(s). A photodiode can be any kind of photosensor including a CCD photosensor or a CMOS photosensor.

Sensor panel 121 can include green pixels 501a, blue pixels 501b, and red pixels 501c. Green pixels 501a have a green spectral filter, blue pixels 501b have a blue spectral filter, and red pixels 501c have a red spectral filter. Although not shown, sensor panel 121 can include pixels with other kinds of spectral filters (e.g., black filters, infrared filters, clear filters, etc.).

Figure 5:
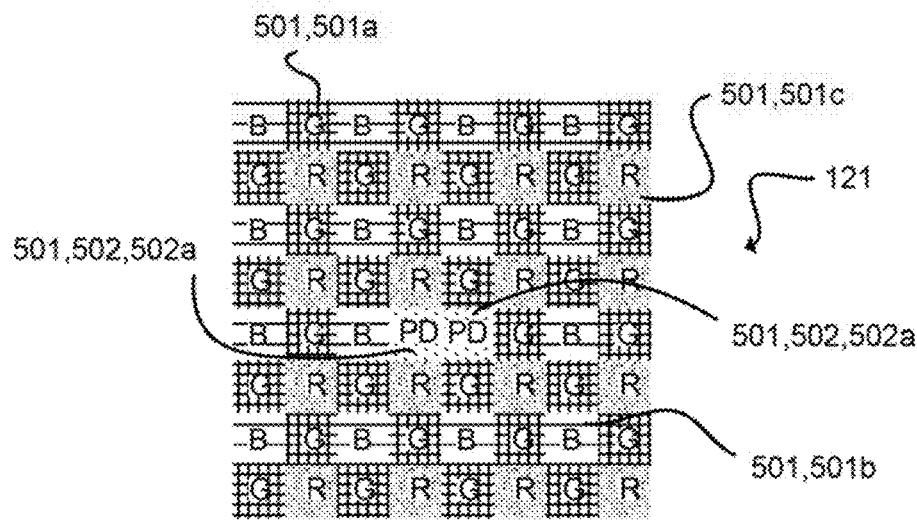
FIG. 5 shows a plurality of sensor pixels of an example sensor panel.
Figure 6:
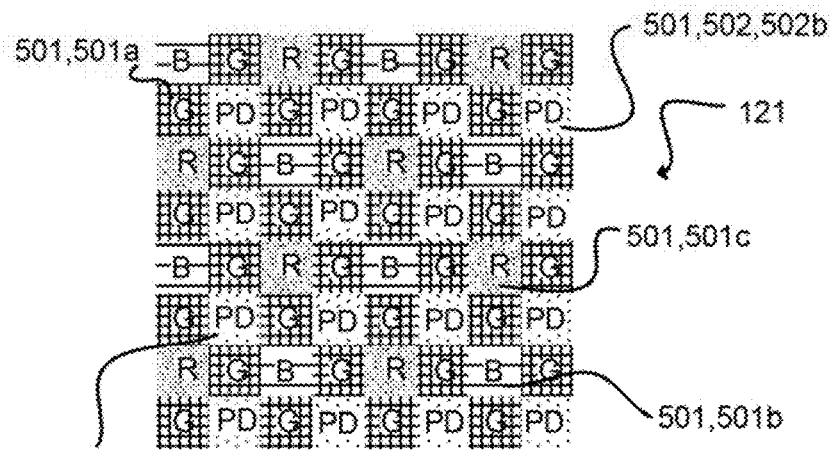
FIG. 6 shows a plurality of sensor pixels of an example sensor panel.
Figure 7:
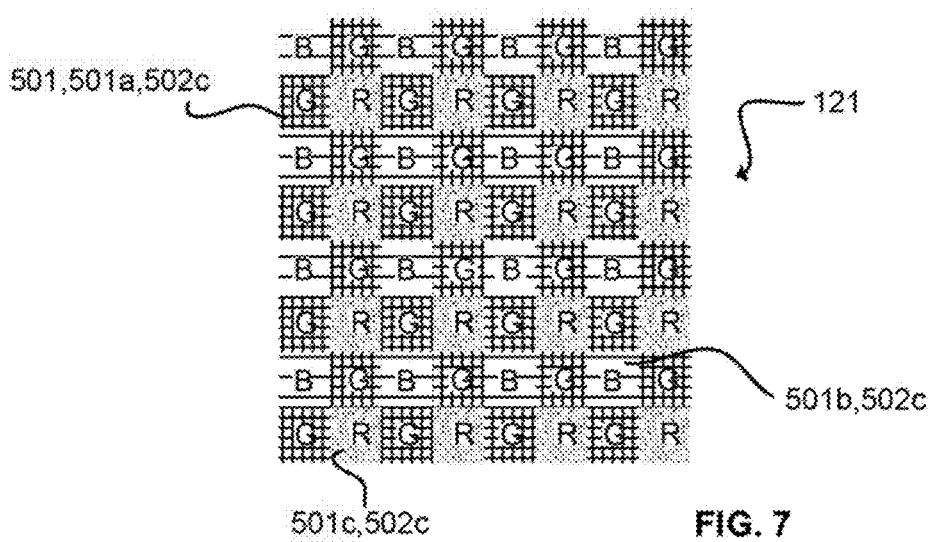
FIG. 7 shows a plurality of sensor pixels of an example sensor panel.

FIGS. 5-7 illustrate three of many possible arrangements of sensor pixels 501. As with all features disclosed herein, the claimed inventions are not limited to the sensor panels 121 shown in FIGS. 5-7. Referring to FIGS. 5-7, sensor panel 121 can include phase detection (PD) sensor pixels 502. PD sensor pixels 502 can have any kind of spectral filter such as green, blue, red, infrared, black, clear, etc.

As shown in FIG. 5, each PD sensor pixel 502a can include a single photodiode and be disposed directly adjacent to another PD sensor pixel 502a. Directly adjacent PD sensor pixels (e.g., PD sensor pixels 502a) can have the same spectral filter (e.g., both green). Therefore, PD sensor pixels 502a can be identical to green sensor pixels 501a. Although FIG. 5 only shows two PD sensor pixels 502a, sensor panel 121 can include many PD sensor pixels 502a (e.g., tens of thousands).

Directly adjacent PD sensor pixels can form a phase detection pixel pair. Because each pixel has a photodiode, directly adjacent PD sensor pixels can also form a phase detection photodiode pair. PD sensor pixels 502a can include shielding. For example, the right half of the left PD sensor pixel 502a can be shielded and the left half of the right PD sensor pixel 502a can be shielded (left and right are from the reader's perspective when viewing FIG. 5).

Referring to FIGS. 6 and 7, PD sensor pixels 502 can each include a plurality of photodiodes even if non-PD sensor pixels only include a single photodiode. In FIG. 6, PD sensor pixels 502b each include a plurality (e.g., two, four, etc.) of photodiodes disposed under a spectral filter and a microlens, while the remaining sensor pixels can only include a single photodiode disposed under a spectral filter and a microlens. In FIG. 7, every sensor pixel 501 includes a plurality (e.g., two, four, etc.) of photodiodes. Therefore, every sensor pixel 501 of FIG. 7 can serve as a PD pixel 502. Each sensor pixel 501 of FIG. 7 can include a common spectral filter and a common microlens.

In FIG. 6, PD sensor pixels 502b are spaced apart from each other. Because each PD sensor pixel 502b includes a plurality of photodiodes (e.g., two, four, etc), each PD sensor pixel 502b forms a phase detection photodiode pair (and multiple pairs in the case of four or more photodiodes). Likewise, in FIG. 7, each PD sensor pixel 502c forms a phase detection photodiode pair (and multiple pairs in the case of four or more photodiodes). The present application generally uses the example of a left/right phase detection photodiode pair, but other arrangements can be used alternatively or in addition such as a top/bottom pair, a bottom left and a top right pair, and so on.

Figure 10:
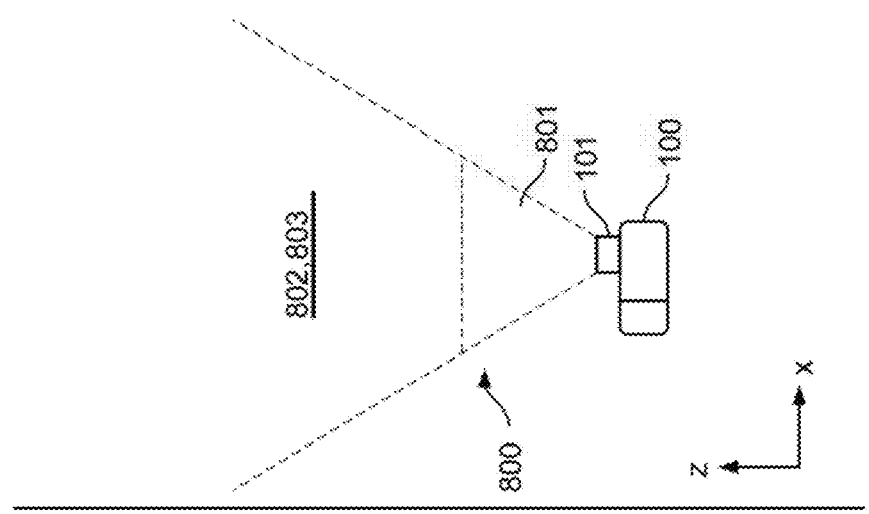
FIGS. 8-10 show example optical fields.
Figure 9:
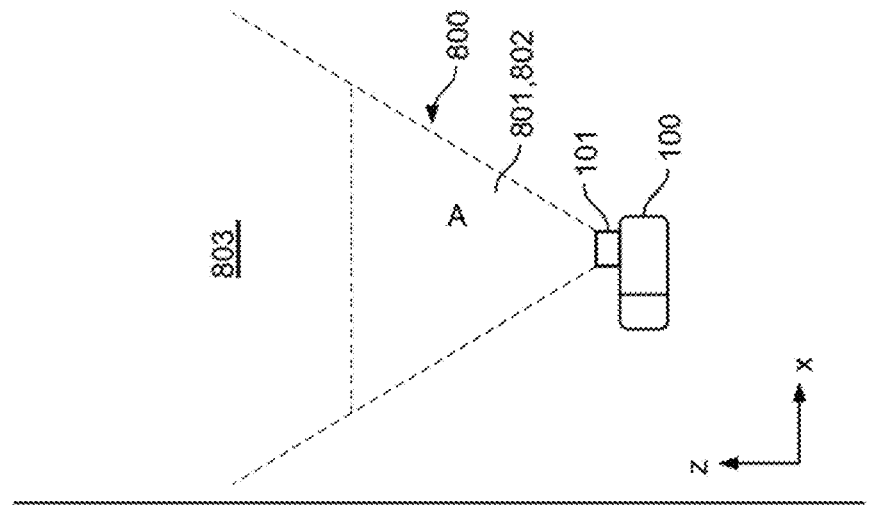
Figure 8:
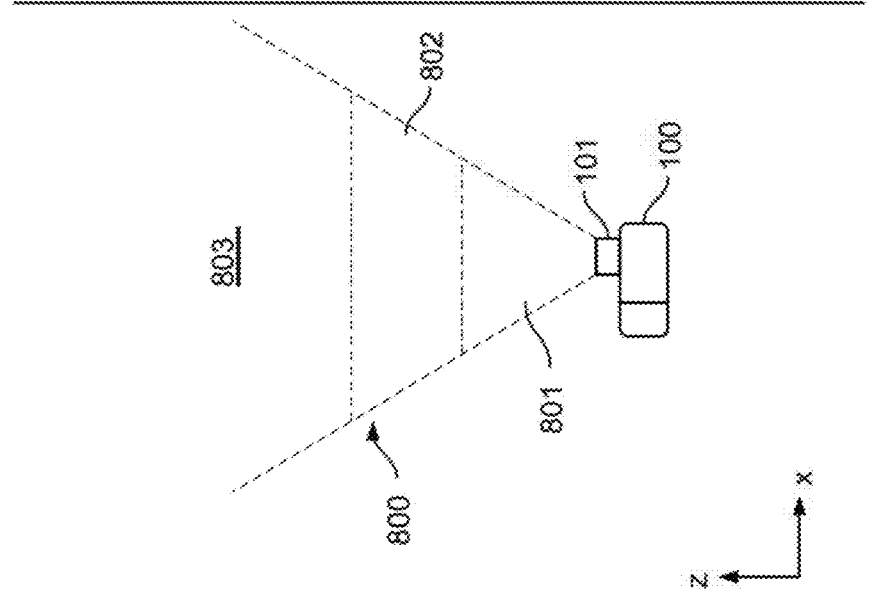

FIGS. 8-10 show camera 101 of processing system 400 imaging a scene 800. FIG. 8-10 are from a top plan (i.e., bird's eye) perspective. The perspective of scene 800 can change depending on the internal configuration of camera 101 such as aperture size, lens diameter, lens focal point, sensor panel 121 area, sensor panel 121 resolution, etc. As shown, an image of scene 800 can include optical fields (also called optical volumes or depth ranges) such as foreground 801, field of focus (also called depth of field) 802, and background 803. Depth outside of the field of focus can be blurry while depth inside the field of focus can be crisp. Foreground 801, field of focus 802, and background 803 are also called focus-defined optical fields or focus-defined depth ranges since the numerical depth ranges corresponding to each of these optical fields can change depending on the optical properties of camera 101.

In FIG. 8, foreground 801, field of focus 802, and background 803 are sequential. In FIG. 9, field of focus 802 is at least partially coextensive with foreground 801. In FIG. 10, field of focus 802 is at least partially coextensive with background 803.

Scene within field of focus 802 is in-focus (e.g., substantially in focus) on sensor panel 121. Scene outside field of focus 802 is out-of-focus on sensor panel 121. Therefore, scene outside the field of focus 802 (e.g, in foreground 801 or background 803 in FIG. 8, in background 803 in FIG. 9, and in foreground 801 in FIG. 10) will appear blurry.

Processing system 400 can autofocus camera 101 to adjust the dimensions of field of focus 802. For example, processing system 400 can autofocus to translate field of focus 802 forwards or backwards. During translation, the field of focus 802 can become shallower or deeper depending on the optical properties of camera 101. In some examples, camera 101 can be incapable of autofocus.

IV

Processing system 400 can be configured to capture images with camera 101. An image can include a plurality of different image pixels. Each image pixel can spatially map to one sensor pixel. For an example, an image pixel with coordinates (1,1) can map to a sensor pixel with coordinates (1,1), an image pixel with coordinates (x, y) can map to a sensor pixel with coordinates (x, y), and so on.

Each image pixel can have one or more spectral channels. A spectral channel can be one of a plurality of predetermined options, determined according to a desired spectral space. In RGB spectral space, each image pixel can include a red, a green, and/or a blue spectral channel. Other spectral spaces (e.g., CIE) are consistent with the present disclosure. As used herein a spectral channel can correspond to non-visible light such as infrared light.

Each spectral channel can have a spectral value falling within a predetermined range such as 0-255 (8-bits per channel), 0-511 (9-bits per channel), 0-1023 (10-bits per channel), 0-2047 (11-bits per channel), and so on. The spectral value can indicate a magnitude of the spectral channel. For example, a spectral value of zero can indicate a spectral channel with zero magnitude. For clarity, image pixels are considered to include a spectral channel when the spectral value thereof is zero. Image pixels do not include a spectral channel when the spectral value thereof is unassigned.

Images can have a plurality of different stages and exist in a plurality of different states. Stages can include a mosaic stage and a full-channel stage. States can include a transient state and a stable state. When the present disclosure refers to an image, the image can be a portion or patch of a larger image. Alternatively, the image can represent an entire and complete image. An image can be a video frame.

In a mosaic stage, each image pixel includes fewer spectral channels than are required for a full-channel image (as determined by the desired spectral space). According to some examples, each image pixel in an image mosaic (i.e., an image in a mosaic stage) includes a single spectral channel, and thus a single spectral value. Each image pixel in an image mosaic can include a single spectral channel but a different spectral value for each photodiode of the corresponding sensor pixel. In a full-channel stage, each image pixel includes a number of spectral channels equal to the number required by the desired spectral space. For example, in RGB spectral space, each image pixel includes three spectral channels (red, green, and blue).

A mosaic can have a spectral pattern. Processing system 400 can initially capture an image in a mosaic with a spectral pattern matching the arrangement of the spectral filters. For example, if processing system 400 captured an image mosaic with sensor panel 121 of FIG. 7, the top left image pixel would have a blue spectral channel and spectral value(s) determined by photocharge(s) collected by the photodiode(s) of the corresponding sensor pixel. Therefore, in some examples, each sensor pixel 501 shown in FIGS. 5-7 can map to a plurality of different image sub-pixels (not shown) in the first mosaic. Each sub-pixel can map to one photodiode.

Processing system 400 can convert the mosaic (i.e., the first mosaic) into a full-channel image via full-channel interpolation. Full-channel interpolation can include assigning a plurality of spectral channels (e.g., two, three, four, five, etc.) to each image pixel. For example, if processing system 400 observes RGB spectral space, each image pixel can be assigned a red spectral channel, a green spectral channel, and a blue spectral channel during full-channel interpolation. Full-channel interpolation is not necessary. According to some examples, processing system 400 can directly perform the below-discussed feature detection on an image mosaic. For example, if each spectral filter is an infrared spectral filter, then full-channel interpolation may be unnecessary.

Full-channel interpolation can include remosaicing the first mosaic into a second mosaic and then performing full-channel interpolation on the second mosaic. Remosaicing can include binning. For example, each image pixel in the first mosaic can include a spectral channel with a plurality (e.g., two, four) of spectral values (e.g., one per photodiode spatially mapping to the image pixel). During binning, the plurality of spectral channels for each image pixel can be combined (e.g., averaged).

Full-channel interpolation can include directly performing full-channel interpolation on the first mosaic. After full-channel interpolation, the image can exist in a full-channel state where each pixel is assigned an equal number of spectral channels (even if some of the spectral values of the spectral channels are zero).

Any stage of an image can be in a transient state, where the image exists as signals in processing system 400 or a stable state, when the image is preserved in memory (e.g., volatile memory and/or non-volatile memory). Whether in transient form or stable form, an image can have a resolution, which quantifies the detail that the image holds. The smallest unit of resolution can be an image pixel. Stable image and transient images can have image pixels stored in compressed form. For example, a JPEG is a full-channel image. The three spectral channels of each image pixel in a JPEG are stored in a compressed format (e.g., in the frequency domain). Upon accessing a JPEG, processing system 400 can use a codec to unpack the three spectral channels of each image pixel.

As discussed above, the term "spectral" (e.g., spectral channel, spectral value, full-channel image), is not limited to human-visible colors and can include light frequency ranges outside the human-visible spectrum. For example, infrared is a "color" and "spectral channel" even though humans cannot see infrared light.

V

Figure 11:
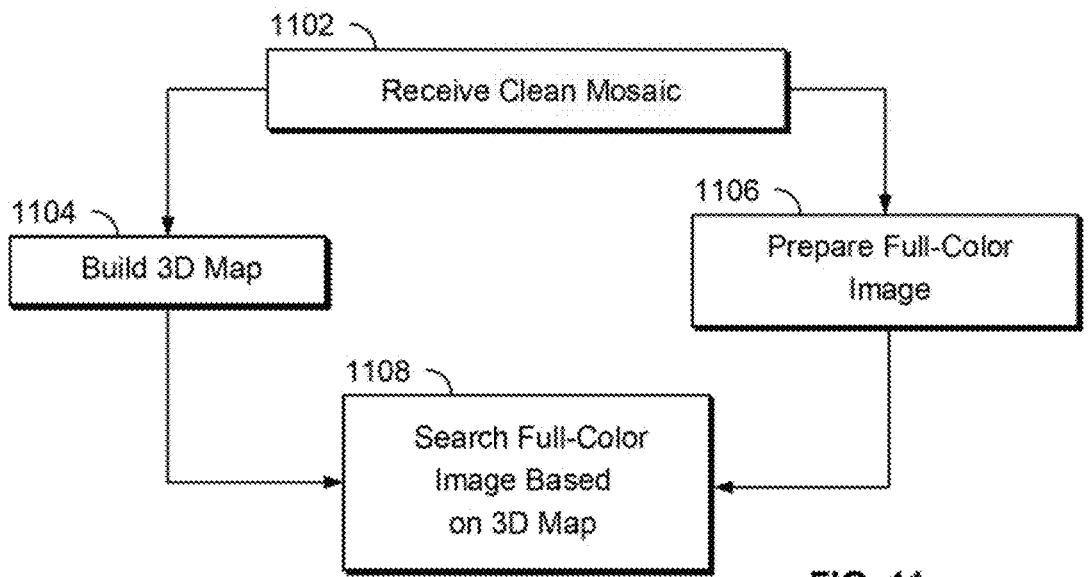
FIG. 11 shows an example method of searching an image based on a 3D map.

FIG. 11 shows a method of conducting feature detection in an image based on a three-dimensional map ("a 3D map"). As used herein "3D" means "at least three-dimensions", not "only three dimensions". As discussed below, a 3D map can be a depth map. As used herein the term "search" can mean feature extraction and/or feature classification.

At block 1102, processing system 400 can receive an image mosaic. The image mosaic can be captured by camera 101. The image mosaic can be loaded from non-volatile memory. As stated above, the image mosaic can include a plurality of spectral values for each image pixel (e.g., when sensor panel 121 includes sensor pixels with a plurality of photodiodes). Each spectral value can map to a measurement of one photodiode.

At block 1104, processing system 400 can build one or more three-dimensional maps based on the image mosaic. A 3D map can include at least three axes including an X-axis, a Y-axis, and a Z-axis. The 3D map X-axis and Y-axis can respectively spatially map to X-axes and Y-axes of the image mosaic and/or full-channel image. Since processing system 400 can spatially map (e.g., link, correspond) any location in a 3D map to an image mosaic and a full-channel image based on the X and Y axes, each image pixel can have a depth value (expressed, for example, in meters or phase disparity).

The unit of resolution of the 3D map can be equal to an image pixel such that the 3D map has the same horizontal (i.e., X) and vertical (i.e., Y) dimensions as the mosaic and the full-channel image. Alternatively, the unit of resolution of the 3D map can be larger (i.e., coarser) than the unit of resolution of the image mosaic and/or the full-channel image. Therefore, one point (i.e., coordinate) in the 3D map can map to a plurality of image pixels in the image mosaic and/or the full-channel image.

The Z-axis of a 3D map can quantify (e.g., approximate, determine) depth in the physical universe. For example, the Z-axis can quantify phase disparity, which approximates depth. The Z-axis can quantify depth in terms of a physical dimension (e.g., meters) along an optical axis of camera 101.

Figure 12:
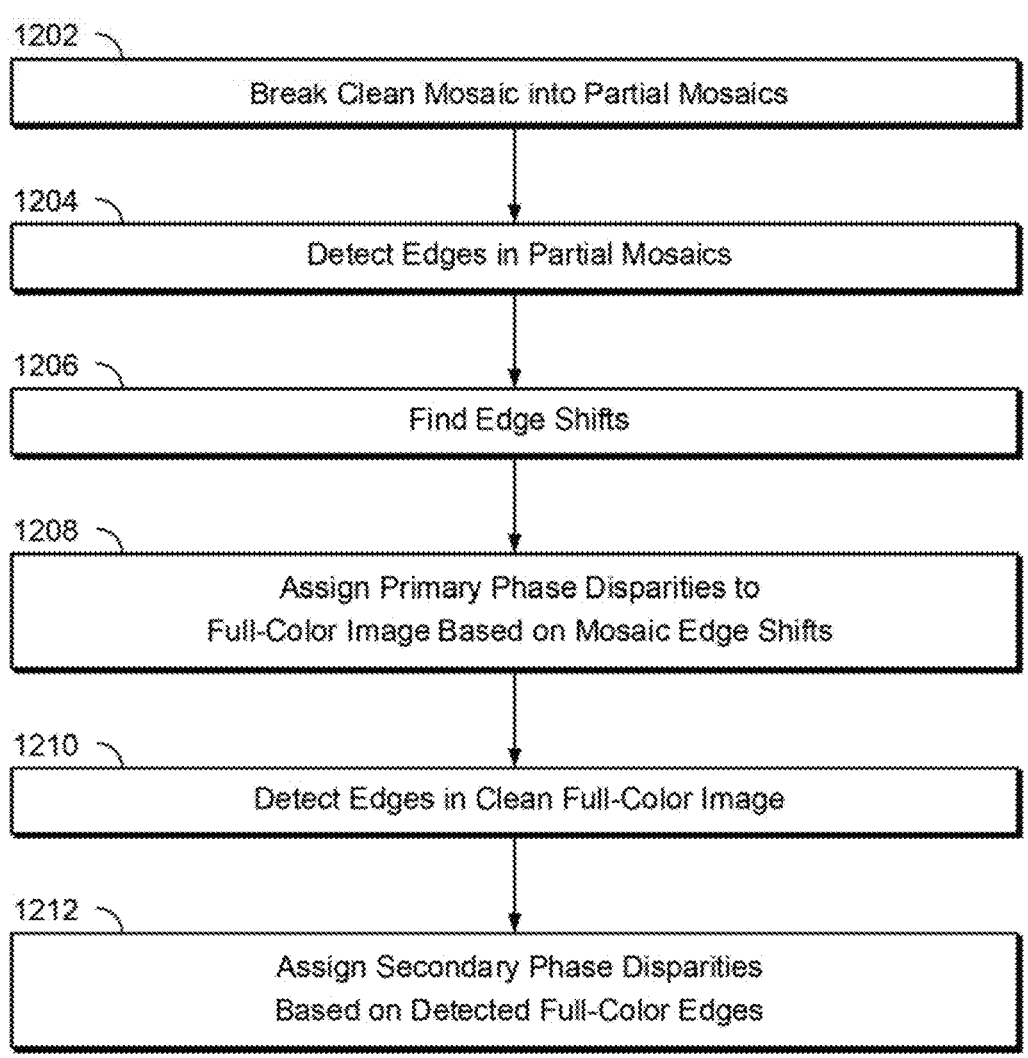
FIG. 12 shows an example method of building a 3D phase disparity depth map. The method of FIG. 12 can occur during block 1104 of FIG. 11.

Processing system 400 can build the one or more 3D maps with the method of FIG. 12. Processing system 400 can build the one or more 3D maps with any suitable technique. For example, processing system 400 can use an infrared rangefinder or a stereoscopic camera pair to build the one or more 3D maps. Instead of natively building the 3D map, processing system 400 can import the 3D map from another device.

At block 1106, processing system 400 can prepare (e.g., create, build) a full-channel image based on the image mosaic. Processing system 400 can prepare the full-channel image via full-channel interpolation. During full-channel interpolation, processing system 400 can bin the image mosaic to assign a single spectral value to each image pixel, then perform full-channel interpolation on the binned image mosaic.

At block 1108, processing system 400 can conduct feature detection on the full-channel image based on the 3D map. Processing system 400 can use the 3D map to segment the full-channel image into two-dimensional territories. Each territory can encompass a different optical field. Each territory can be centered about a desired optical field.

For example, and referring to FIG. 9, a first territory can encompass foreground 801 and a second territory can encompass background 803. Processing system 400 can search territories sequentially. For example, processing system 400 can fully search a first territory before searching a second territory. If certain ending conditions are satisfied, processing system 400 can terminate the search before all territories are searched.

Each territory can consist of a single contiguous region in the image or can include a plurality of discrete regions. Different territories can be discrete (e.g., a first territory and a second territory can be non-overlapping). Alternatively, different territories can be at least partially intersecting. For example, a second territory can encompass (e.g., subsume, enclose) a first territory.

During feature recognition, processing system 400 can sweep a plurality of neighborhoods (also called windows) across each territory. A territory can be expanded (further discussed below) before neighborhood sweeping. Each territory can have a box (e.g., rectangular) shape. Each territory can have any closed geometrical shape. Each neighborhood can have a box (e.g., rectangular) shape. Each neighborhood can have any closed geometry.

Processing system 400 can conduct feature extraction and/or feature classification within each application of a neighborhood. For example, if a single neighborhood is applied 1,000 times while being swept across a territory, processing system 400 can perform the same feature extraction and/or feature classification within the single neighborhood 1,000 times during the sweep. Alternatively, processing system 400 can conduct a full sweep with the neighborhood to extract features, then apply feature classification after the full sweep is conducted.

VI

Figure 15:
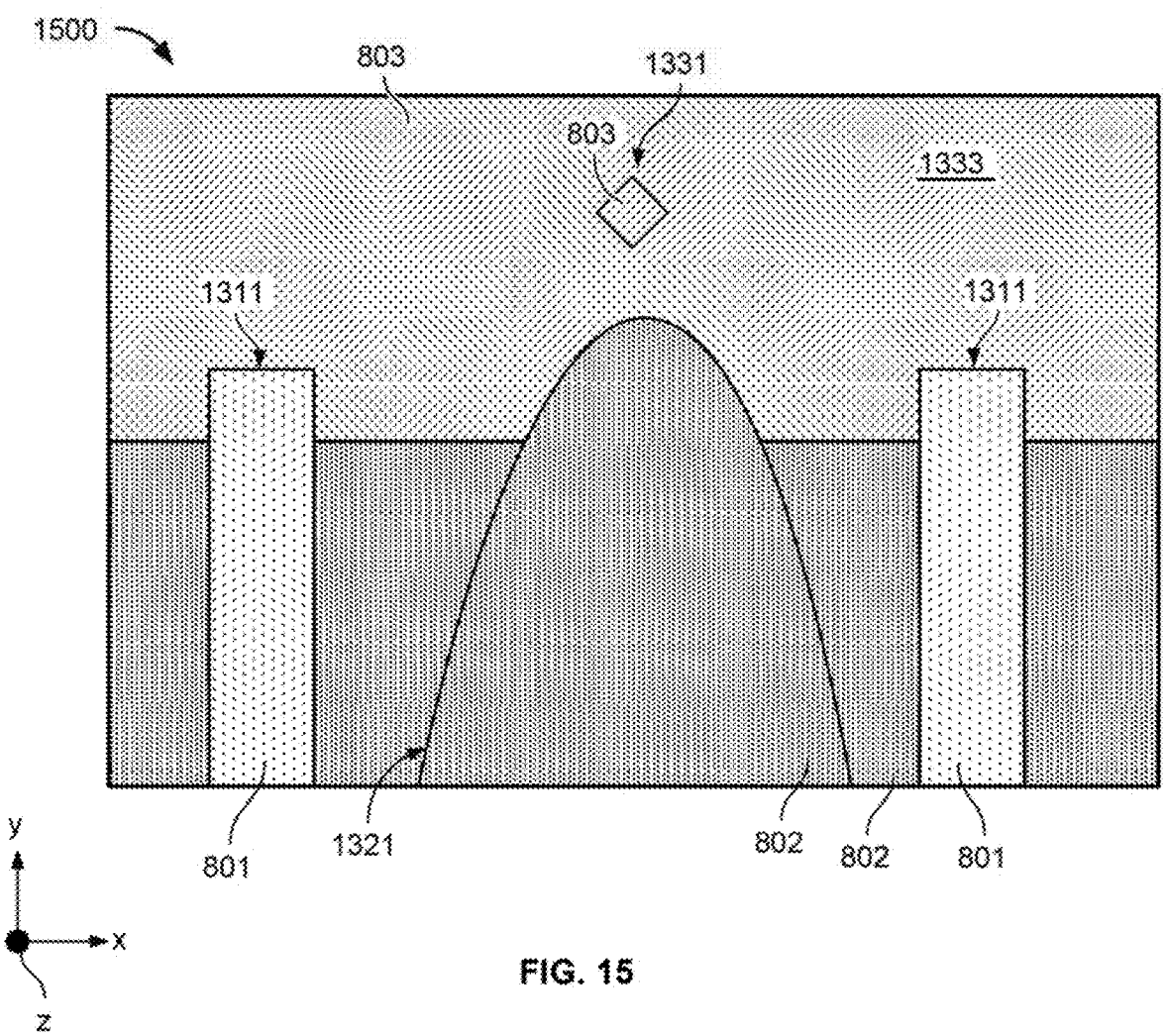
FIG. 15 shows an example 3D phase disparity depth map.

FIG. 12 shows a method for preparing (e.g., producing, generating, creating) a 3D phase disparity depth map (also called a first 3D map). The Z-axis of the first 3D map can describe phase disparity of a point in the X-Y plane. FIG. 15 (further discussed below) illustrates a first 3D map. The method of FIG. 12 can occur during block 1104 in FIG. 11.

The first 3D map can proceed through a plurality of stages. After a first or initial stage, the first 3D map can include phase disparity data for a plurality of primary locations (e.g., X-Y coordinates). After a second stage, the first 3D map can include phase disparity for a plurality of secondary locations (e.g., X-Y coordinates).

The aggregate of the primary and secondary locations can represent the complete X-Y plane of the first 3D map. Therefore, each X-Y coordinate in the second stage first 3D map can assign a phase disparity (e.g., a depth value) to each image pixel in the image mosaic and/or the full-channel image. Because the X-Y plane unit of resolution can be coarser than an image pixel, the 3D map can assign the same phase disparity to a plurality of neighboring image pixels.

For convenience, the present application uses the example of a common X-Y coordinate system for a full-channel image and a depth map unless noted otherwise. However, any disclosed instance of the common X-Y coordinate system should be understood to optionally include a case where the depth map has a coarser or finer resolution than the full-channel image. If the depth map has a coarser resolution, each coordinate in the depth map can link to a plurality of neighboring pixels (e.g., a block of pixels) in the full-channel image.

At block 1202, processing system 400 can break the image mosaic into a plurality of (e.g., two) partial mosaics, including a first partial mosaic and a second partial mosaic. Partial mosaics are further described below with reference to FIG. 14.

The first partial mosaic can include spectral values from left phase detection photodiodes in each pair, but not right phase detection photodiodes. The first partial mosaic can only include spectral values from left phase detection photodiodes. The second partial mosaic can include spectral values from right phase detection photodiodes in each pair, but not left phase detection photodiodes. The second partial mosaic can only include spectral values from right phase detection photodiodes. Because the mosaic can have a resolution equal to the number of photodiodes in sensor panel 121 (instead of the number of sensor pixels 501 in sensor panel 121), the first and second partial mosaics can each have a resolution equal to the full-channel image.

At block 1204, processing system 400 can detect edges in each of the partial mosaics. Processing system 400 can perform edge detection by applying one or more high pass filters to each of the partial mosaics. Suitable high pass filters are known in the art.

At block 1206, processing system 400 can compare the partial mosaics. Processing system 400 can identify a shift between matching edges (e.g., the distance between one edge in the first partial mosaic and the same edge in the second partial mosaic). Edge shift is further addressed below with reference to FIG. 14.

At block 1208, processing system 400 can begin building the first 3D map. For each matched edge, processing system 400 can identify the corresponding X-Y coordinates in the first 3D map. Processing system 400 can assign a phase disparity to each X-Y coordinate in the first 3D map based on a shift dimension. For example, if the shift for a certain edge is high, the phase disparity can be large. If the shift for a certain edge is small, the phase disparity can be low (e.g., zero).

Processing system 400 can assign only a magnitude of phase shift. Alternatively, processing system 400 can assign a magnitude of phase shift and a sign (either positive or negative). Phase shift sign is further discussed below with reference to FIG. 14.

At block 1210, processing system 400 can detect edges in the full-channel image. Processing system 400 can do so by applying a high-pass filter to the full-channel image. Suitable high pass filters are known in the art.

At block 1212, processing system 400 can assign phase disparity values (e.g., secondary phase disparity values) to the locations (i.e., secondary locations) in the first 3D map that lack a phase disparity value based on (a) the primary phase disparity values and (b) the edges detected in the full-channel image (called full-channel edges) during block 1210.

Processing system 400 can find the secondary phase disparity values (i.e., the phase disparity values of the secondary locations) by interpolating the primary phase disparity values based on the detected full-channel edges. Block 1212 is further discussed below with reference to FIG. 15.

Figure 13:
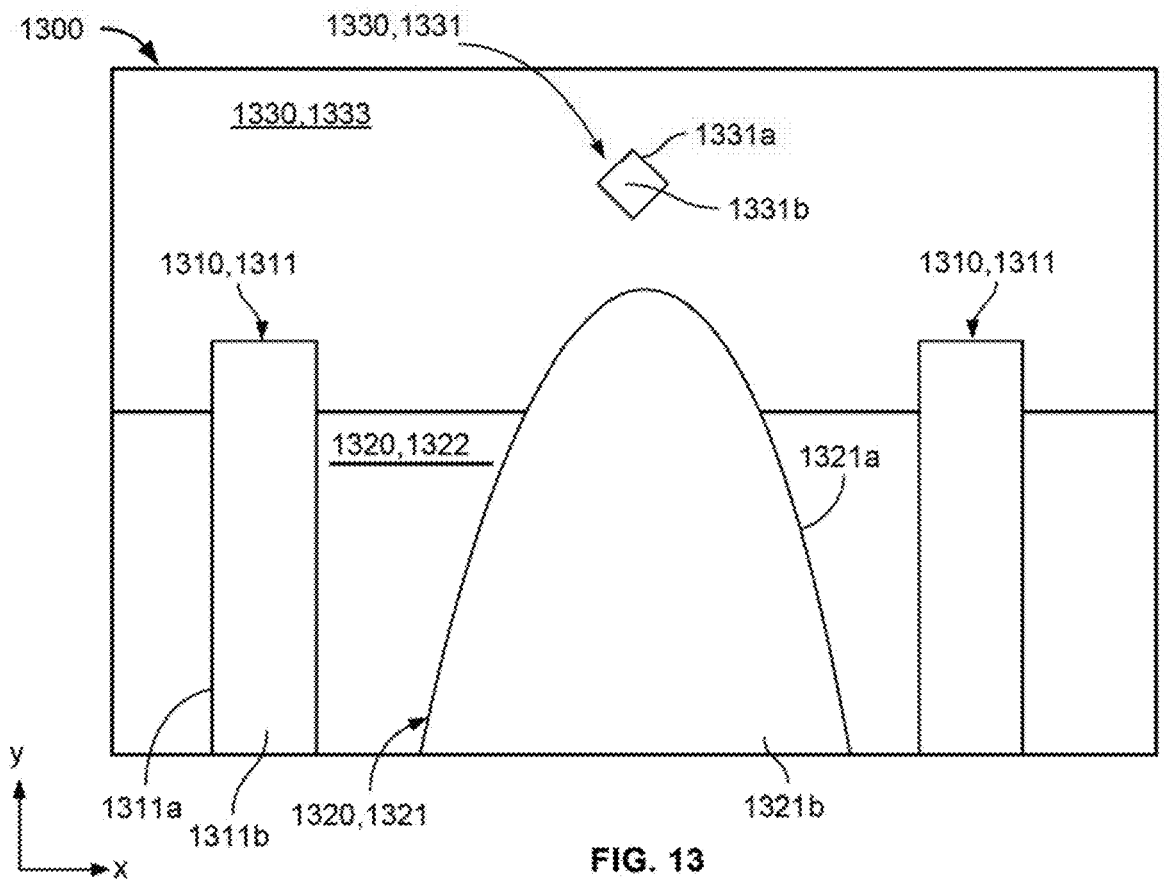
FIG. 13 shows an example full-channel image of a scene.

FIG. 13 represents a full-channel image 1300 of a scene. Full-channel image 1300 includes foreground 1310, field of focus 1320, and background 1330. Foreground 1310 includes posts 1311. Each post 1311 includes edges 1311a defining a color field 1311*b* (i.e., an area without edges or with weak edges). Weak edges can be filtered with strong high pass filters, but preserved with weak high pass filters.

Field of focus 1320 includes a hill 1321 posed against an ocean 1322. Hill 1321 includes an edge 1321*a* defining a color field 1321*b*. Ocean 1322 is calm and therefore consists of one or more color fields and one or more weak edges.

Background 1330 includes an object 1331 (e.g., a star) and sky 1333. Object 1331 includes edges 1331*a* defining a color field 1331*b*. Sky consists of a color field.

Figure 14:
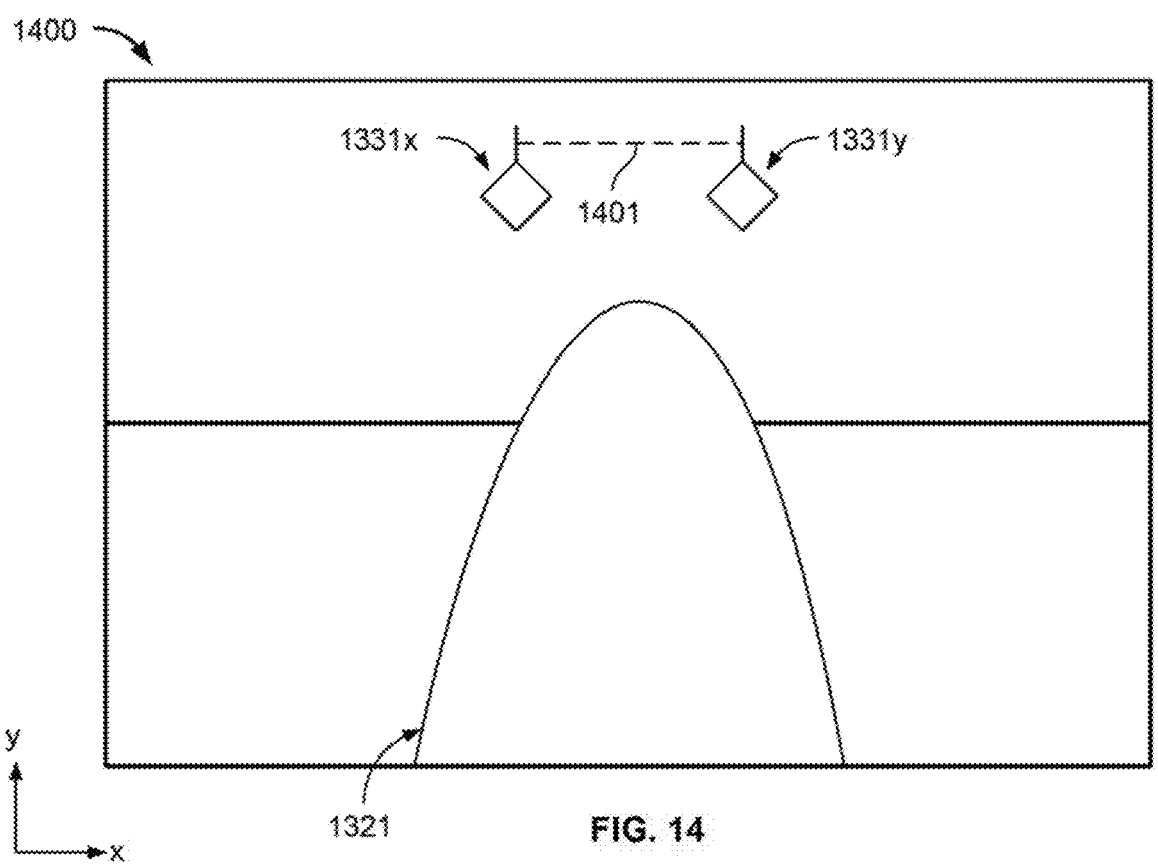
FIG. 14 shows an overlay between a right partial image mosaic and a left partial image mosaic.

FIG. 14 shows a left partial mosaic overlaid with a right partial mosaic. For convenience, FIG. 14 omits posts 1311. The left partial mosaic shows hill 1321 and right object 1331*y*. The right partial mosaic shows hill 1321 and left object 1331*x*.

Processing system 400 can assign a zero (e.g., low) phase disparity to hill edge 1321*a* since hill edge 1321*a* has the same position in both the left and right mosaics. After applying a high pass filter, processing system 400 can match the edges of left object 1331*x* with the edges of right object 1331*y*. Processing system 400 can compute a shift (e.g., dimension 1401) between each of the matching edges. Processing system 400 can assign a phase disparity to each edge (e.g., each image pixel of each edge) based on the shift.

Although not shown, each post 1311 can exhibit a left-right shift in the overlay 1400. Because the posts 1311 are in foreground (as opposed to object 1331, which is in background), the shift of posts 1311 can be opposite to the shift of object 1331. As a result, the left partial mosaic can show each post 1311 shifted to the left (whereas object 1311 was shifted to the right) and the right partial mosaic can show each post 1311 shifted to the right (whereas object 1311 was shifted to the left).

Therefore, processing system 400 can assign a phase disparity magnitude to each image pixel according to a magnitude of the shift and processing system 400 can compute a sign for the phase disparity based on shift direction. For example, an edge with a right shift in the left partial mosaic and a left shift in the right partial mosaic can have a positive phase disparity. An edge with a left shift in the left partial mosaic and a right shift in the right partial mosaic can have a negative phase disparity. The positive and negative signs are arbitrary and can be swapped.

FIG. 15 represents an example second stage 3D phase disparity depth map 1500. The hatching pattern of posts 1311 indicates foreground. The foreground has a high magnitude and negative phase disparity. The hatching pattern of hill 1321 and ocean 1322 indicates field of focus. The field of focus has a low magnitude phase disparity. The hatching pattern of object 1331 and sky 1333 indicates background. The background has a high magnitude and positive phase disparity. Note these hatching conventions do not necessarily apply to later-discussed figures.

Processing system 400 can select a predetermined negative value to separate foreground from field of focus. Processing system 400 can select a predetermined positive value to separate field of focus from background.

Because 3D map 1500 is in the second stage, each location has been assigned one of a primary or a secondary phase disparity. Processing system 400 can assign secondary phase disparity by interpolating primary phase disparity based on edges in full-channel image 1300. Processing system 400 can begin by interpolating secondary phase disparities for color fields confined within a closed object, where the edges of the closed object have sufficiently similar phase disparities.

Object 1331 has a closed geometry (based on object edges 1331*a* shown in full-channel image 1300) and object edges 1331*a* have a similar positive phase disparity. Therefore, the processing system 400 can interpolate phase disparity for object color field 1331*b* based on object edges 1331*a*.

If processing system 400 reaches a stall (i.e., is unable to further interpolate), processing system 400 can apply a weaker high-pass filter to the left and right partial mosaics. The weaker high-pass filter can reveal additional edges. Processing system 400 can extract new primary phase disparities from the new overlay, then reapply the above-discussed interpolation rules.

Processing system 400 can continue to iterate until each X-Y coordinate in the first 3D map has received at least one of a primary and secondary phase disparity. For some iterations, processing system 400 can relax the interpolation rules (e.g., interpolate across edges).

Examples of 3D map generation were described above. The present application is not limited to these examples. A 3D map can be generated according to any desired technique. The 3D map can be a phase disparity depth map or any other kind of depth map. The phase disparity map can be created with any suitable technique and not only the techniques discussed above.

VII

Figure 16:
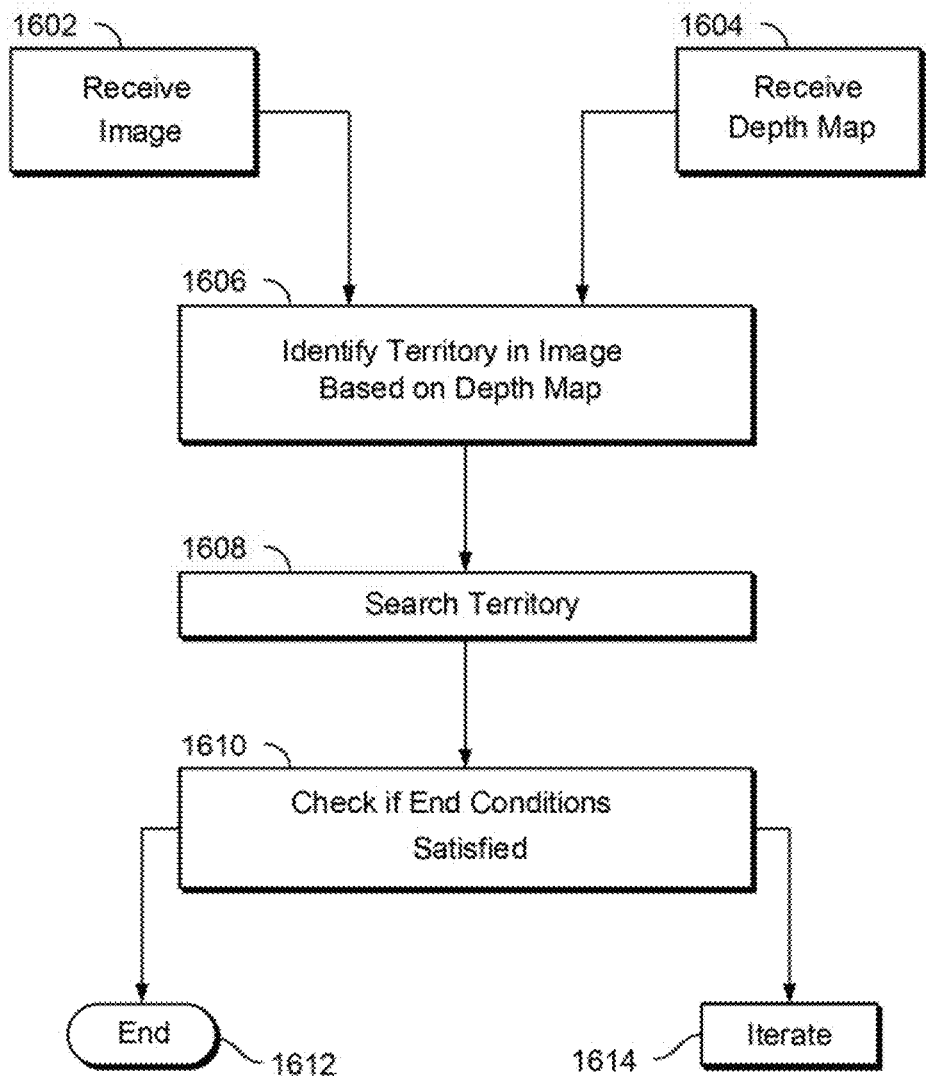
FIG. 16 shows an example method of searching an image based on a 3D map. The method of FIG. 16 can occur during block 1108 of FIG. 11.

FIG. 16 shows a method of searching an image based on a depth map. As used herein the term "searching" can include feature extraction and/or feature classification. The method of FIG. 16 can occur during block 1108 of FIG. 11. As with all methods and operations disclosed herein, processing system 400 can be configured to perform the method depicted in FIG. 16.

Figure 17:
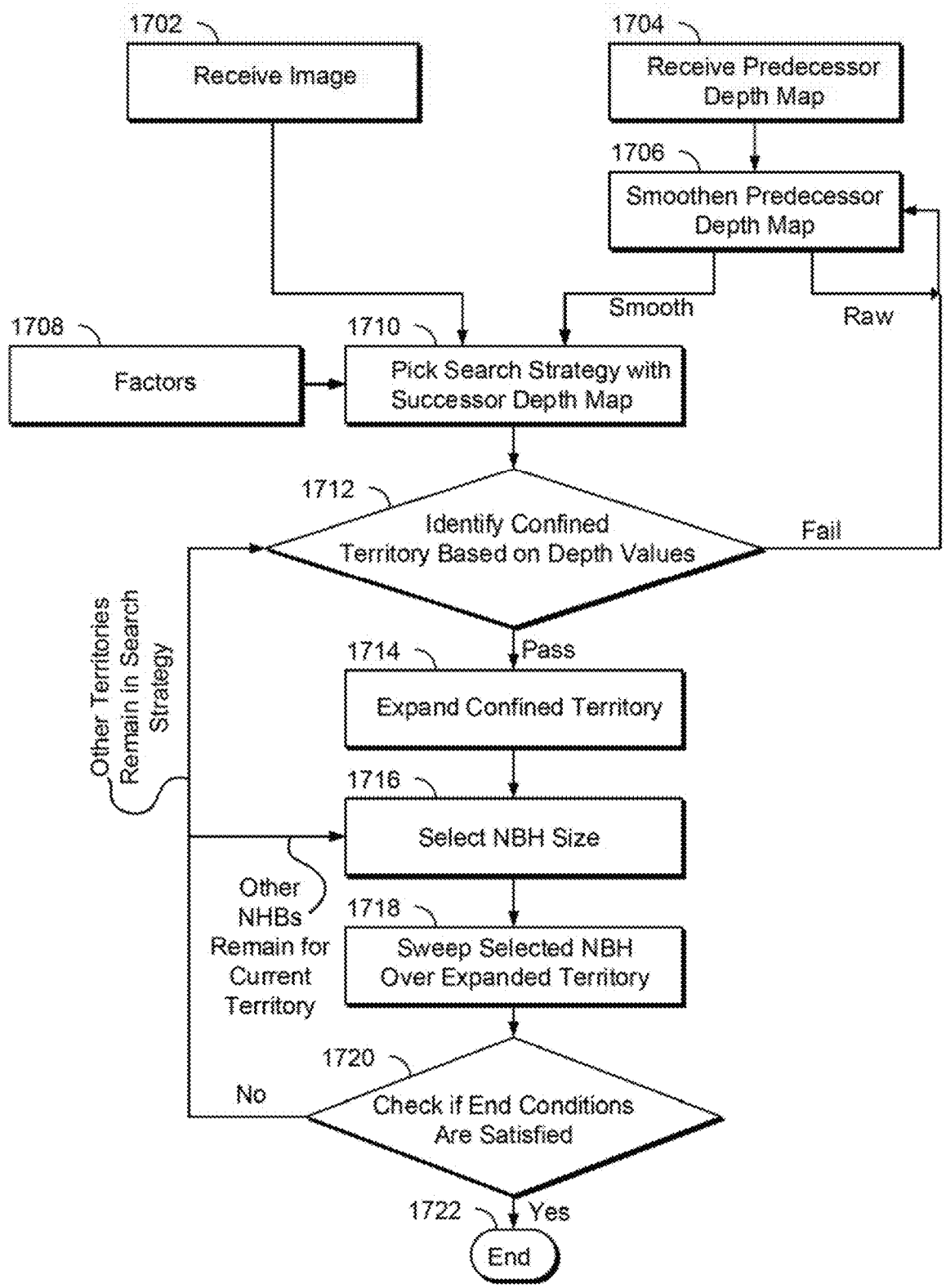
FIG. 17 shows an example method of searching an image based on a 3D map. The method of FIG. 17 can occur during block 1108 of FIG. 11. The method of FIG. 17 can represent an example implementation of the method of FIG. 16.

Any (e.g., each) feature in the method of FIG. 16 can apply to the method depicted in FIG. 17. Any (e.g., each) feature in the method of FIG. 17 method can apply to the method of FIG. 16. For convenience, the present application discusses depth in terms of meters (m). However, any depth in meters should be understood to optionally refer to a corresponding phase disparity. Conversion of depth in meters to phase disparity is known in the art.

The search of FIG. 16 can be for any real or virtual feature. For example, the search of FIG. 16 can be for any human face. Alternatively, the search of FIG. 16 can be for a predetermined edge direction or spectral value.

At block 1602, processing system 400 can receive an image. The image can be a full-channel image. The image can be transient or stable. Processing system 400 can receive the image by preparing a full-channel image with camera 101. Processing system 400 can receive the image from an external source (e.g., over the Internet).

At block 1604, processing system 400 can receive a depth map (i.e., a 3D map). The depth map can correspond to the image and thus quantify one or more regions of the image in a depth direction. The depth map can be a phase disparity map produced with the method of FIG. 12.

Processing system 400 can receive both the full-channel image and the depth map by processing a common image mosaic captured with camera 101. Processing system 400 can prepare a depth map with the image mosaic via the method of FIG. 12. Processing system 400 can prepare a full-channel image with the image mosaic via full-channel interpolation.

At block 1606, processing system 400 can identify a territory (also called a primary region of interest) in the received image based on the received depth map. For example, processing system 400 can identify image pixels with depth values intersecting a desired (e.g., predetermined) optical field. The territory can consist of a single discrete and contiguous two-dimensional region (i.e., X-Y plane) in the image (e.g., territory 2711, discussed below). The territory can include a plurality of discrete (e.g., non-contiguous) two-dimensional regions in the image. The territory can be a confined territory and/or an expanded territory (e.g., territory 2711), as further discussed below.

The territory can consist of a predetermined optical field. The territory can include a desired optical field (e.g., a desired depth range) and limited portions of other optical fields bordering the desired optical field. The territory can include all determined instances of a predetermined optical field within the image. The territory can include a plurality of optical fields. The optical field can be expressed in terms of dimensions (e.g., 0-10 m) or expressed in terms of focus (e.g., background). Whether confined or expanded, each territory can be centered about a predetermined (e.g., desired) optical field.

Figure 27:
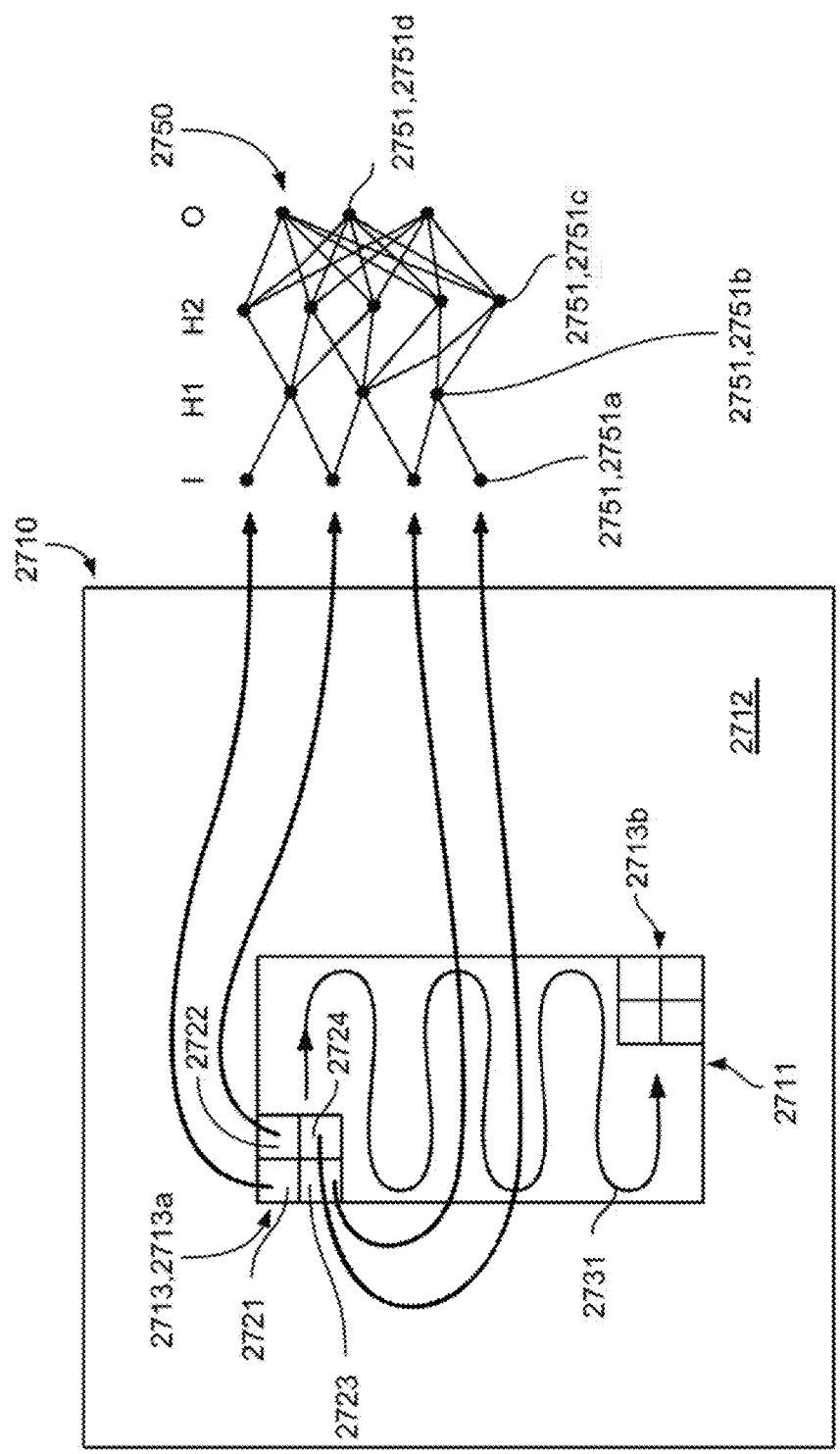
FIG. 27 shows an example image, territory, neighborhood, and neural network.

At block 1608, processing system 400 can search (e.g., feature detect) within the territory. As previously discussed, searching can include feature extraction and/or feature classification. The territory search can include sweeping one or more neighborhoods (also called secondary regions of interest) across the territory. FIG. 27, discussed below, shows an example of neighborhood 2713 being swept (via path 2731) across territory 2711.

The territory search can be confined within borders of the territory. The territory search can follow a predetermined route (e.g., sweep row-by-row and/or column-by-column). The territory search can follow a dynamic path (e.g., follow identified edges). The territory search can apply a neighborhood (or each neighborhood) to each image pixel within the territory (unless the overall image search concludes early). The territory search can involve feature extraction and/or feature classification.

The territory search (e.g., territory feature detection) can be sequentially conducted with a plurality of different sized neighborhoods (e.g., neighborhood 2713 in FIG. 27, discussed below). Each neighborhood can be applied consecutively, such that a territory search with one neighborhood is concluded such that a territory search with the following neighborhood is initiated. Each application of a neighborhood (e.g., neighborhood 2713) can result in an independent feature extraction and/or feature classification. The feature extraction and/or classification can be conducted with a neural network (e.g., neural network 2750 of FIG. 27).

The territory search can begin with a neighborhood of a first size and end with a neighborhood of a second size. The first size can be larger or smaller than the second size. As such, the first neighborhood can have a larger or smaller area than the second neighborhood. Each neighborhood can be box-shaped (e.g., square shaped) and have a size or area equal to the number of image pixels confined within the neighborhood.

The territory search can begin with a maximum sized neighborhood. After finishing the territory search with the maximum sized neighborhood, processing system 400 can repeat the process with increasingly smaller neighborhoods. The territory search can begin with a minimum sized neighborhood. After finishing the territory search with the minimum sized neighborhood, processing system 400 can repeat the process with increasingly larger neighborhoods.

Processing system 400 can determine the maximum and/or minimum sized neighborhoods based on a total area of the territory. The maximum and/or minimum sized neighborhoods can be predetermined proportions of the total territory area. The maximum sized neighborhood can be set to encompass $1/2$, $1/3$, $1/5$, $1/10$, $1/20$, $1/50$, $1/100$, $1/1000$, etc. of the total number of image pixels within the territory (i.e., the total territory area). The minimum sized neighborhood can be set to encompass any proportion of the total number of image pixels less than the maximum sized neighborhood. The minimum sized neighborhood can be $1/10$, $1/20$, $1/50$, $1/100$, $1/1000$, $1/5000$, $1/10,000$, $1/50,000$, $1/100,000$ of the total territory area.

Alternatively or in addition to determining maximum and minimum neighborhood size based on total territory area, processing system 400 can determine maximum and/or minimum neighborhood size based on a depth of the territory (e.g., the expanded territory) to be searched. For example, if a first expanded territory to be searched has an area of 1,000,000 pixels and is set to encompass a depth of 3 m from camera 101 (examples of how expanded territories are set are discussed below), then processing system 400 can apply a larger maximum neighborhood size and a larger minimum neighborhood size to the first expanded territory. If a second expanded territory to be searched has the same area of 1,000,000 pixels and is set to encompass a depth of 20 m from camera 101, then processing system 400 can apply a smaller maximum neighborhood size and a smaller minimum neighborhood size to the second expanded territory.

As another example, if an expanded territory is set to encompass a depth range (e.g, 0-20 m), then processing system 400 can set a maximum neighborhood size based on the nearest value of the depth range (here, 0 m) and a minimum neighborhood size based on the furthest value of the depth range (here 20 m).

As further discussed below with reference to FIG. 27, processing system 400 can conduct feature extraction and/or feature classification within each application (also called instance) of a single neighborhood. Processing system 400 can do so by feeding image pixel data within a single application of a neighborhood into a neural network 2750.

At block 1610, processing system 400 can determine whether end conditions have been satisfied. Block 1610 can occur in parallel with block 1608. For example, processing system 400 can perform block 1610 after each application of a neighborhood. According to some examples, processing system 400 can examine a score returned by a neural network 2750 configured to process each application of a neighborhood. The score can be a classification matrix (e.g., vector) listing a confidence of neural network 2750 in each of a plurality of different real objects existing within a neighborhood application.

If the score includes a high confidence (e.g., confidence above a predetermined threshold value) that a particular neighborhood application includes a human face (or a predetermined number of faces), the ending conditions can be satisfied. Processing system 400 can then mark the coordinates of the last neighborhood (e.g., as metadata in the image being considered), then end the method of FIG. 11. Processing system 400 can further mark, as metadata, any territories searched and the neighborhoods applied during each territory search. Processing system 400 can therefore end the method of FIG. 11 before a neighborhood and/or a territory has been applied over every image pixel in a particular image.

If the end conditions are unsatisfied, processing system 400 can iterate at block 1614. Processing system 400 can iterate by retaining the same neighborhood and moving the neighborhood. If a particular neighborhood has been fully swept over a territory, processing system 400 can iterate by selecting a new neighborhood with a different size, then sweeping the new neighborhood across the territory.

Processing system 400 can begin with a maximum sized neighborhood, and, after conducting a full sweep with the maximum sized neighborhood, repeat the process with increasingly smaller sized neighborhoods. Processing system 400 can begin with a minimum sized neighborhood and, after conducting a full sweep with the minimum sized neighborhood, repeat the process with increasingly larger neighborhoods. As previously discussed, the maximum and/or minimum neighborhood can be dynamically selected based on a total size of the territory (e.g., the expanded territory) to be searched.

If the current territory has received a full sweep with the maximum sized neighborhood, the minimum sized neighborhood, and each intermediate neighborhood, processing system 400 can iterate by selecting a new territory.

The new territory can overlap with the previous territory. The new territory can encompass the previous territory. The new territory can avoid any overlap with the previous territory. The new territory can be selected by choosing a new optical field.

For example, if the previous territory was identified by choosing an optical field of 1-3 m (or corresponding phase disparity values, which can positively correlate to depth in meters after Z axis shifting to make all phase disparity values zero or positive), then the new territory can be identified by choosing an optical field with a new range (e.g., 2-4 m or 3-5 m). The new optical field can be selected to not overlap the previous optical field. For example, if the previous optical field was 1-3 m, then the new optical field can be 3-5 m. Alternatively, the new optical field can be selected to overlap the previous optical field. For example, if the previous optical field was 1-3 m, then the new optical field can be 2-infinity m. The new optical field can be selected to subsume (e.g., encompass) the previous optical field. For example, if the previous optical field was 0-5 m, then the new optical field can be 0-10 m.

Referring to FIGS. 8-10, processing system 400 can identify (e.g., select) a territory order based on optical field (e.g., depth range).

(A) Processing system 400 can set the first optical field for the first territory as foreground 801 and set the second optical field for the second territory as background 803.

(B) Processing system 400 can set the first optical field for the first territory as foreground 801, the second optical field for the second territory as field of focus 802, and the third optical field for the third territory as background 803.

(C) Processing system 400 can set the first optical field for the first territory as field of focus 802, the second optical field for the second territory as foreground 801, and the third optical field for the third territory as background 803.

(D) Processing system 400 can set the first optical field for the first territory as foreground 801, the second optical field for the second territory as foreground 801 plus field of focus 802, and the third optical field for the third territory as background 803.

(E) Processing system 400 can set the first optical field for the first territory as foreground 801, the second optical field for the second territory as foreground 801 plus a portion of field of focus 802 and/or background 803, and the third territory as any remaining field.

(F) Processing system 400 can set the first optical field for the first territory as field of focus 802, the second optical field for the second territory as field of focus 802 plus a predetermined range (e.g., ±3 m) outside of field of focus 802, a third optical field for the third territory as field of focus 802 plus a greater predetermined range (e.g., ±12 m) outside field of focus 802.

(G) Processing system 400 can set the first optical field for the first territory as field of focus 802 and the second optical field for the second territory as a plurality of non-intersecting depth ranges falling outside the field of focus 802. For example, processing system 400 can set the second optical field to include 0—beginning of field of focus 802 plus end of field of focus 802—infinity meters.

If the 3D map is a phase disparity depth map, processing system 400 can (a) replace any instances of meters disclosed herein with phase disparity values (which positively correlate to meters after Z axis shifting) and/or (b) convert any phase disparity values into meters (e.g., using known calibration parameters of camera 101).

Processing system 400 can select one of the above search orders based on a detected camera 101 position (e.g., a position of a lens in camera 101 and/or a known kind of lens in camera 101). Therefore, processing system 400 can apply a first search order for a first camera 101 and a second different search order for a second camera 101.

Processing system 400 can set a final optical field for each possible search order as the entire image (i.e., 0-infinity meters). According to some examples, processing system 400 can jump to a search of the entire image (i.e., set the territory as the entire image) when predetermined conditions are satisfied (e.g., an insufficient number of real objects were detected in the first optical field or an insufficient number of real objects were cumulatively detected in the first and second optical fields).

As discussed below, processing system 400 can first identify a confined territory, then identify an expanded territory. Even if a non-overlapping new optical field is selected, at least the expanded territory of the new optical field can at least partially (or only partially) overlap with the expanded territory of the previous optical field. When processing system 400 sets an optical field for a territory (as discussed above), processing system 400 can approximate a complete two-dimensional area of the set optical field for a confined territory, then expand the confined territory. Confined and expanded territories are further discussed below.

VIII

FIG. 27 shows an image 2710. With a 3D map (e.g., a depth map generated with a stereoscopic camera pair, a range finder, and/or phase detection pixels of a single camera), processing system 400 has isolated (e.g., identified) a territory 2711 that is shaped as a non-square rectangle. Territory 2711 can represent a first expanded territory. Expanded vs. confined territories are further discussed below. Area 2712 represents the portion of image 2710 external to territory 2711.

Processing system 400 can conduct a sweep of territory 2711 with neighborhood 2713. Neighborhood 2713 can begin with application (also called instance or location) 2713a. First neighborhood 2713 can conclude at application 2713b. Intermediate applications are not shown.

Neighborhood 2713 can have a size of 2×2 and thus encompass four image pixels during each application. After each application of neighborhood 2713, processing system 400 can move neighborhood 2713 a predetermined number of image pixels across and/or over. First path 2731 indicates the route neighborhood 2713 can follow across territory 2711.

For example, processing system 400 can move neighborhood 2713 to the right by one horizontal pixel and zero vertical pixels until neighborhood 2713 reaches the right side of territory 2711. At this point, processing system 400 can move neighborhood 2713 down one vertical pixel, then sweep neighborhood 2713 to the left until reaching the left side of territory 2711. Processing system 400 can repeat this process until neighborhood 2713 reaches application 2713b.

Processing system 400 can execute a fresh run of neural network 2750 for each application of neighborhood 2713. Neural network 2750 can be deep and include an input layer, I, a plurality of hidden layers, H1 and H2, and an output layer, O. Neural network 2750 can be fully connected or convolutional. Neural network 2750 can be feed-forward or recurrent. Neural network 2750 can include tens, hundreds, thousands, etc. of hidden layers.

As further discussed below, processing system 400 can reconfigure (i.e., modify) neural network 2750. To reconfigure, processing system 400 can perform one or more of the modifications: modifying the number of nodes, modifying the connections between nodes, applying different weight matrix, applying different activation function, applying a different bias. Processing system 400 can therefore store a plurality of different configurations of neural network 2750 (i.e., store a plurality of different neural networks 2750).

As further discussed below, processing system 2750 can select a configuration of neural network 2750 to apply based on one or more of the following parameters: First, a distance of the optical field (e.g., an optical field centered about 5 m can receive a first neural network 2750 and an optical field centered about 9 m can receive a second neural network 2750), relationship of the optical field to the mechanical configuration of camera 101 (i.e., type of optical field). Second, an identity of an optical field (e.g., an optical field consisting of field of view can receive a first neural network 2750 and an optical field consisting of background can receive a second neural network 2750). Third, a span of an optical field (e.g., an optical field spanning 10 m can receive a first neural network 2750 and an optical field spanning 20 m can receive a second neural network 2750). Fourth, a size of the applied neighborhood (e.g., a neighborhood consisting of 16 pixels can receive a first neural network and an optical field consisting of 128 pixels can receive a second neural network).

Each layer can include a plurality of nodes 2751. The input layer can include input nodes 2751a, the first hidden layer H1 can include first hidden nodes 2751b, the second hidden layer can include second hidden nodes 2751c, and the output layer can include output nodes 2751d. Each hidden and output node 2751b, 2751c, 2751d can be a neuron with a weight matrix, an activation function, and a bias. Neural network 2750 can be pre-trained. Processing system 400 can train neural network 2750. During training, processing system 400 can revise a specific configuration of neural network 2750 (e.g., revise a first neural network 2750, but not revise a second neural network 2750).

Each layer can include a stack of a plurality of different plates (also called sub-layers or plates). For example, input layer I can include three different plates and each plate of a particular layer can include the same number of nodes 2751. Each input node 2751a in the first plate can output a green spectral value of an image pixel within neighborhood 2713. Each input node 2751a in the second plate can output a blue spectral value of an image pixel within neighborhood 2713. Each input node 2751a in the third plate can output a red spectral value of an image pixel within neighborhood 2713.

Each plate of a layer can be two-dimensional. Therefore, each layer can be a three-dimensional stack of plates.

Output layer O can be a fully connected softmax layer. The output layer can be one-dimensional. Each node 2751d in output layer O can quantify the confidence that an application of neighborhood 2751 includes a predetermined real feature. For example, one output node 2751d can quantify the confidence that a single application of neighborhood 2751 includes a human face and another output node 2751d can quantify the confidence that the same application of neighborhood 2751 includes a dog.

As shown in FIG. 27, application 2713a of neighborhood 2713 covers image pixels 2721-2724. Neural network 2750 can execute on a single neighborhood application 2713a by setting input nodes 2751a based on the spectral values of image pixels 2721-2724.

As previously discussed, three input nodes 2751a (e.g., three input nodes 2751a, each in a different plate of the input layer) can extract information from a single image pixel. For example, a first input node 2751a in a first plate can output the green spectral value of image pixel 2721, a first input node 2751a in a second plate can output the blue spectral value of image pixel 2721, and a first input node 2751a in a third plate can output the red spectral value of image pixel 2721.

The same technique can apply to the other image pixels 2722-2724. For example, the second from the top input node 2751a in each input layer plate can extract a spectral value from image pixel 2722, the third from the top input node 2751a in each input layer plate can extract a spectral value from image pixel 2733, and the third from the top input node 2751a in each input layer plate can extract a spectral value from image pixel 2744.

After formatting (e.g., configuring, initializing) the input nodes, neural network 2750 can execute (e.g., run, process). The output layer can return a score (e.g., a matrix such as a vector) quantifying confidence that one or more particular real features (e.g., human faces) exist within the applied neighborhood. After neural network 2750 returns a score, first neighborhood 2751 can occupy a new position as previously discussed. Neural network 2750 can then operate on the pixels within the new application of first neighborhood 2751. Neural network 2750 can therefore return a score for each application of each neighborhood in each territory.

Although neural network 2750 was described as running on a per-neighborhood basis, neural network 2750 can alternatively run on a per-territory basis. In this case, each application of first neighborhood 2751 can represent the local receptive field of a first hidden convolutional layer.

In the above-discussed examples neural network 2750 can act as both a feature extractor and a feature classifier for each application (also called instance) of first neighborhood 2751. Put differently, each layer of neural network 2750 can perform feature extraction and/or feature classification.

As discussed below, a plurality of different sized neighborhoods 2713 can be sequentially applied over a territory 2711. The same neural network (e.g., neural network 2750) can be applied to each neighborhood 2713. Neural network 2750 can be sized to accommodate the largest possible neighborhood 2713. When smaller neighborhoods 2713 are applied, some input nodes 2751a can be duplicated. For example, if each input layer plate of a neural network includes 4000 nodes, but the neighborhood 2713 only encompasses 1000 image pixels, then four input layer nodes 2751a can be assigned to each image pixel.

Alternatively or in addition, some input nodes 2751a can be inactivated. For example, if each input layer map of a neural network includes 4000 nodes, but the applied neighborhood only encompasses 1000 image pixels, then 3000 input nodes 2751*a* can be inactive.

Alternatively or in addition, a different neural network 2750 can be paired with each neighborhood 2713. For example, processing system 400 can be configured to execute a first neural network 2750 for a first sized neighborhood 2713, a second neural network 2750 for a second sized neighborhood 2713, and so on.

Neural network 2750 can be a hardware neural network (e.g., each node 251 can represent a discrete processor). Neural network 2750 can be a software neural network (e.g., each node 2751 can represent a software object). Not every layer of neural network 2750 must simultaneously exist.

IX

FIG. 17 shows a method of searching an image based on a phase disparity depth map. The method of FIG. 17 can represent an example of the example method of FIG. 16. Any features (e.g., operations) disclosed with reference to FIG. 16 can apply to FIG. 17. Any features disclosed with reference to FIG. 17 can apply to FIG. 16.

At block 1702, processing system 400 can receive a full-channel image. At block 1704, processing system 400 can receive a phase disparity depth map. Block 1702 can include any feature discussed with reference to block 1602. Block 1704 can include any feature discussed with reference to block 1604.

Figure 18:
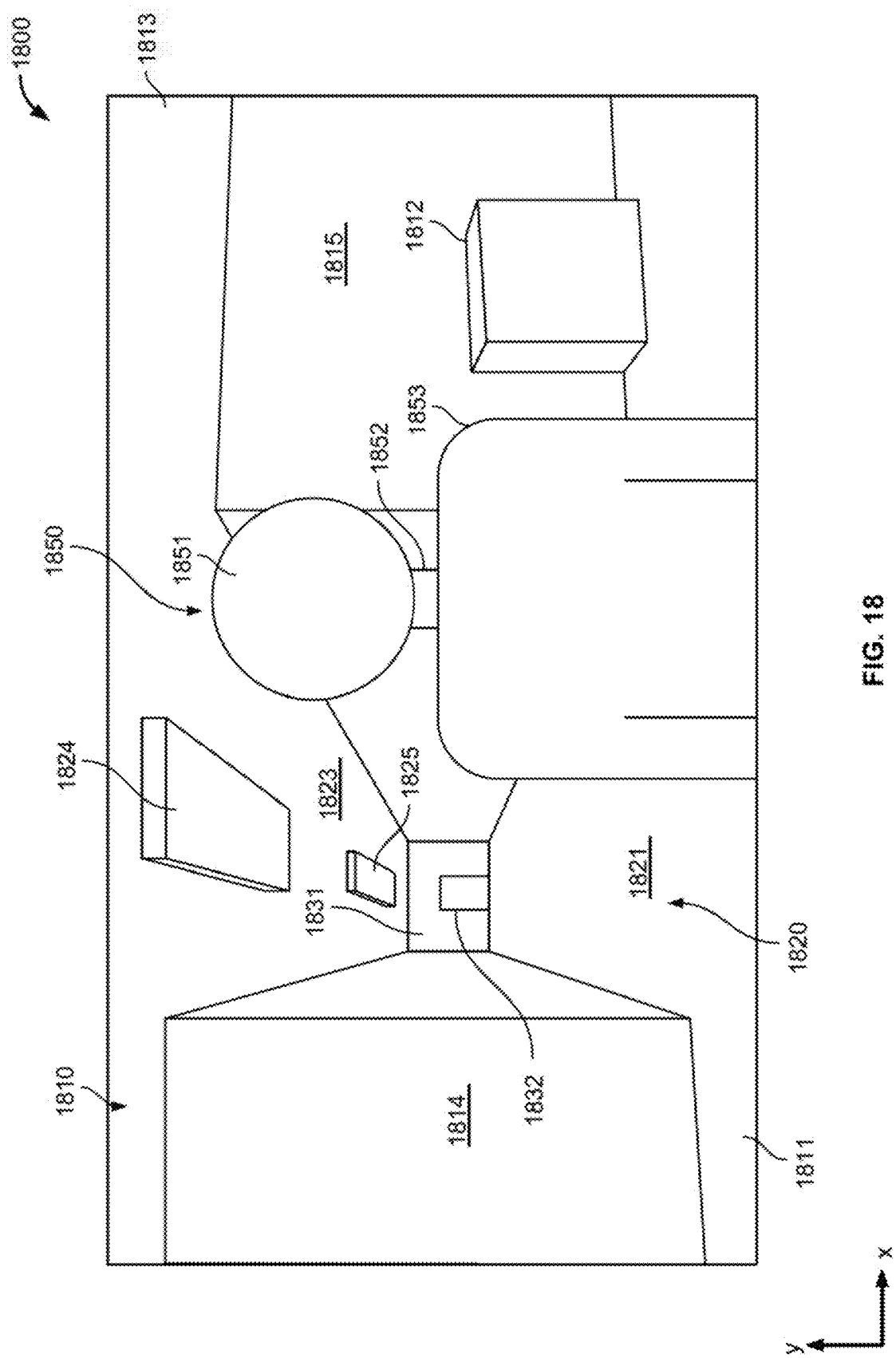
FIG. 18 shows an example full-channel image.

FIG. 18 represents a full-channel image 1800 from camera 101 of a person 1850 standing in an office 1810. Person 1850 includes head/face 1851, neck 1852, and body 1853. Office 1810 includes near floor 1811, box 1812, near ceiling 1813, left wall 1813, right wall 1815, hallway 1820, and end wall 1831. Hallway 1820 includes far floor 1821, far ceiling 1823, near light 1824, and far light 1825. End wall 1831 includes a window 1832.

Figure 19:
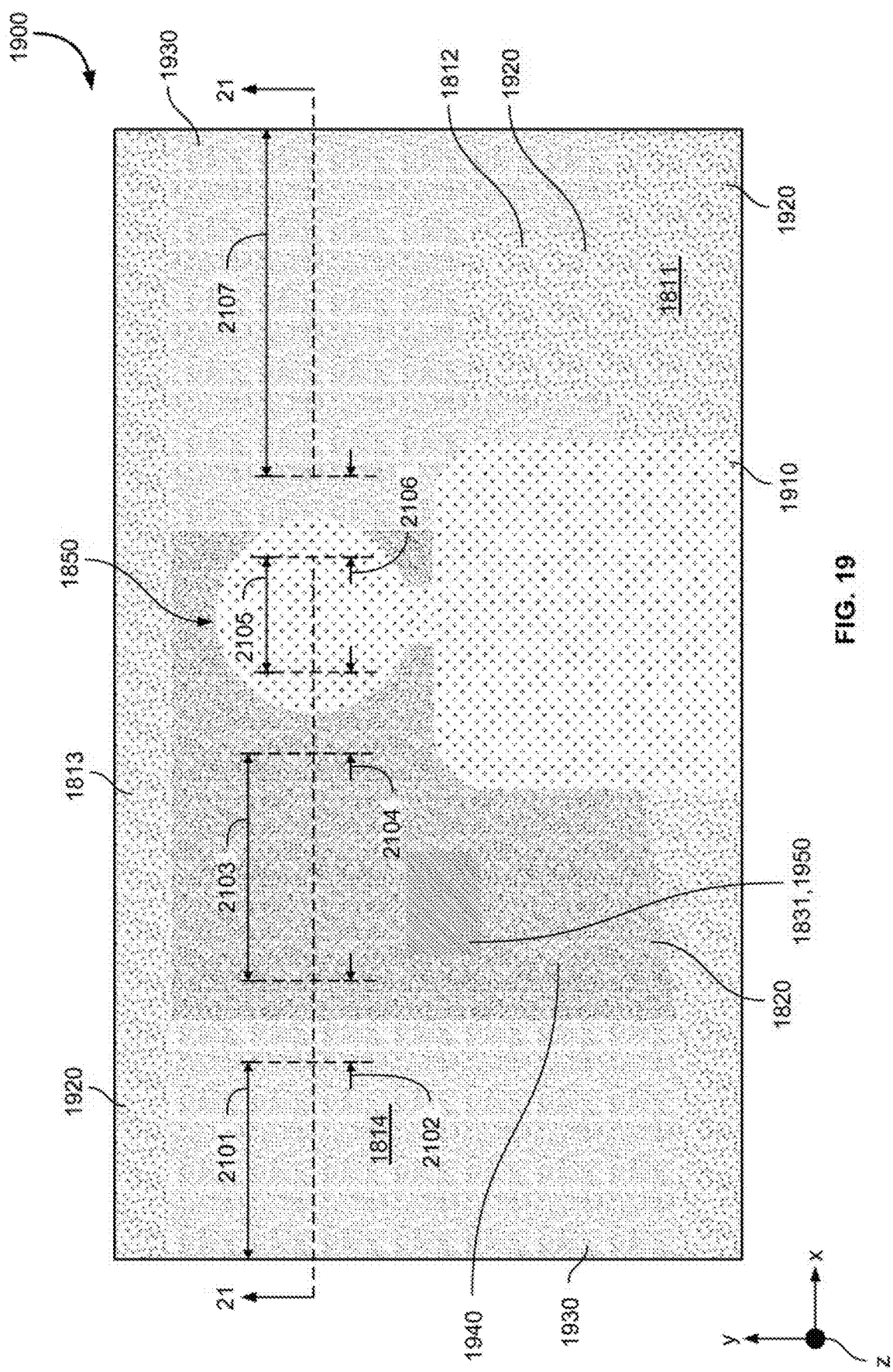
FIG. 19 shows an example depth map of the full-channel image.

FIG. 19 represents a depth map 1900 of image 1800 produced, for example, via the method of FIG. 12. FIG. 19 can represent a phase disparity depth map 1900. FIG. 19 employs hatching to indicate depth range.

Depth range 1910: person 1850. Depth range 1910 can represent 0-1 m of depth. Depth range 1920: near floor 1920, box 1920, and near ceiling 1920. Depth range 1920 can represent 1-3 m of depth. Depth range 1930: left wall 1814 and right wall 1815. Depth range 1930 can represent 3-4 m of depth. Depth range 1940: hallway 1820. Depth range 1940 can represent 4-20 m of depth. Depth range 1950: end wall 1831. Depth range 1950 can represent 20-infinity meters of depth.

Figure 20:
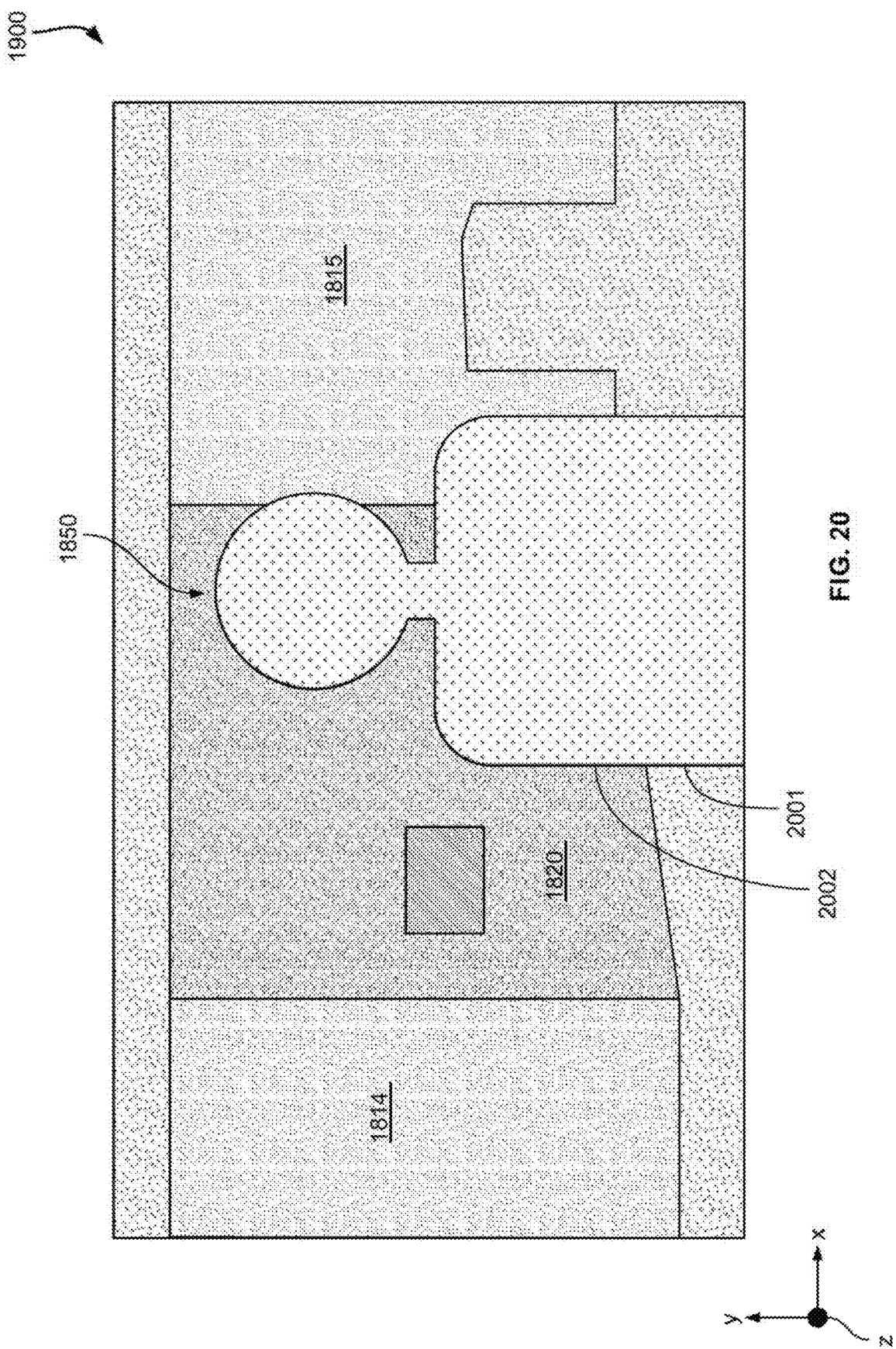
FIG. 20 shows an example depth map of the full-channel image with added depth boundaries.

FIG. 20 is the same view as FIG. 19 with edges added between depth boundaries. For example, edge 2001 separates depth range 1910 from depth range 1920. Edge 2002 separates depth range 1910 from depth range 1940. FIGS. 19 and 20 include some depth errors with respect to FIG. 18. For example, in FIGS. 19 and 20, the area corresponding to near ceiling 1813 is smaller than it should be. Camera 101 may not be perfectly calibrated and thus depth errors can occur.

The lack of edges in FIG. 19 indicates that processing system 400 may be unable to determine the exact boundaries between depths. For example, depth (e.g., phase disparity) values may not sharply transition at edges 2001 and 2002 in FIG. 20. Instead, depth values may slowly transition. Therefore, the depth map of FIG. 19 should be understood as including blurred boundaries between hatching patterns.

Figure 21:
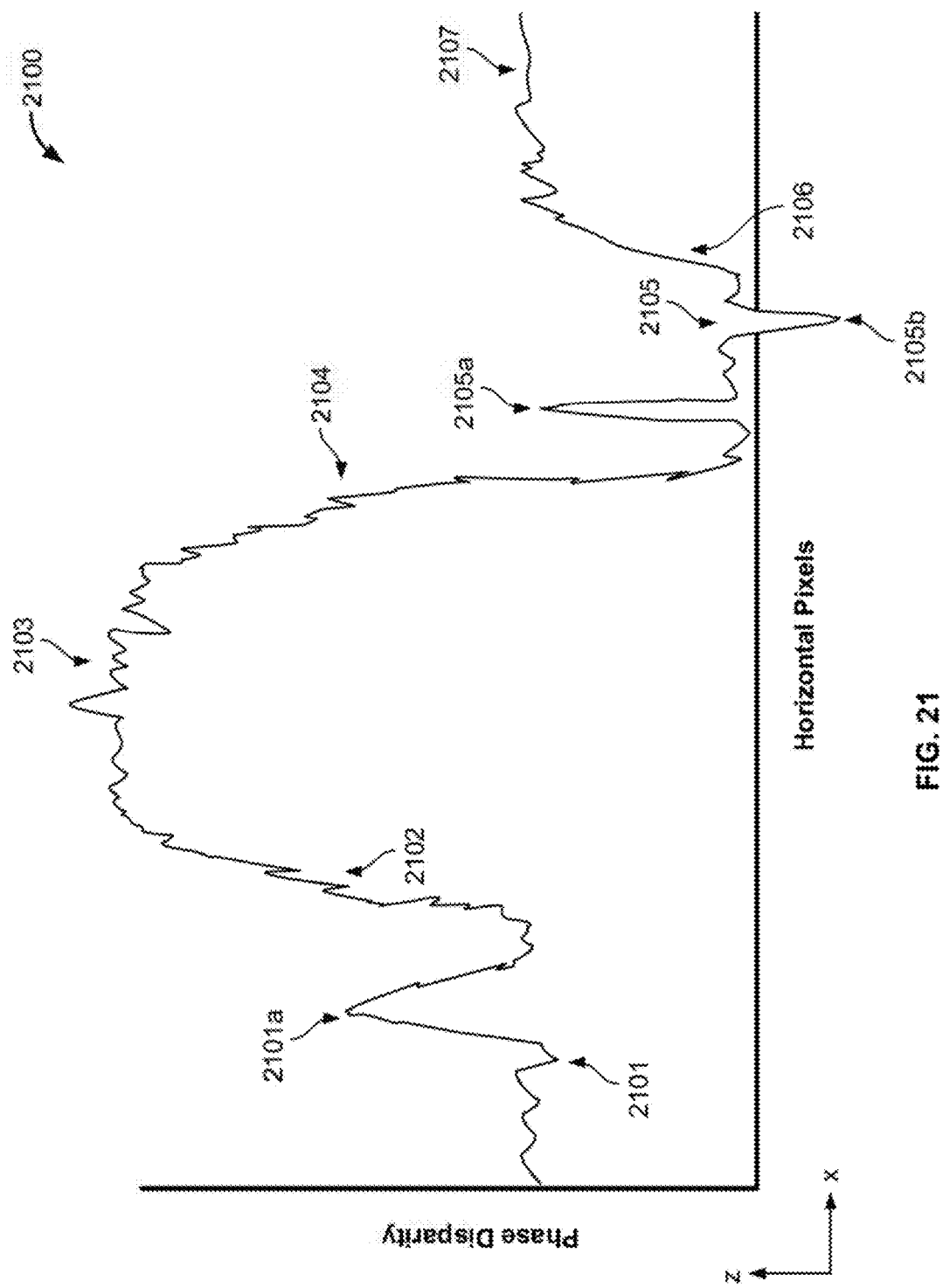
FIG. 21 shows an example raw phase disparity curve taken along plane 21-21 of FIG. 19.

FIG. 21 shows an example cross sectional view taken along plane 21-21 in FIG. 19. In FIG. 21, raw curve 2100 (also called a predecessor curve) is divided into seven sections: 2101-2107. FIG. 19 shows how sections 2101-2107 map onto the depth map across plane 21-21.

As shown in FIG. 21, raw curve 2100 includes numerous errors. If depth map 1900 was perfect, transitions 2102, 2104, and 2106 would be vertical lines instead of slopes and artifacts 2101*a*, 2105*a*, and 2105*b* would be absent. Camera 101 is configured such that foreground 801 and field of focus 802 are coextensive. Therefore, a phase disparity of approximately zero (indicating in-focus light) is both foreground 801 and field of focus 802. Portion 2105 has a phase disparity of approximately zero, artifacts 2015*a* and 2105*b* excluded.

Returning to FIG. 17, processing system 400 can smoothen (e.g., flatten, adjust, modify) depth map 1900 at block 1706. To do so, processing system 400 can apply a low pass filter (e.g., a Gaussian filter). Processing system 400 can compress depth map 1900 at block 1706. As previously discussed, processing system 400 can compress depth map 1900 before, during, or after the smoothening. Processing system 400 can compress depth map 1900 to the same buffer size as full-channel image 1800 to reduce processing time. Block 1706 can include any feature discussed with reference to block 1606.

At (e.g., during) block 1706, processing system 400 can take one or more statistical measurements of smoothened depth map 1900. If depth map 1900 is still raw (e.g., rough), processing system 400 can repeat block 1706 to further smoothen depth map 1900. If depth map 1900 is smooth, processing system 400 can continue to block 1710.

According to some examples, processing system 400 can smoothen depth map 1900 until a single contiguous region has (a) approximately the same phase disparity (e.g., falls within mean±10%) and (b) has the lowest mean phase disparity within depth map. Put differently, if depth map 1900 is viewed from a 3D perspective, processing system 400 can smoothen depth map 1900 until a single contiguous depression is formed within depth map 1900. Depth map 1900 can therefore begin as a raw predecessor depth map 1900 and end as a smoothened successor depth map 1900.

Low-pass filtering can generally include blending neighboring values together. To strengthen transitions, processing system 400 can conduct low-pass filtering based on edge detection on full-channel image 1800. For example, processing system 400 can only blend phase disparity values together for coordinates that are located within the same spectral field (i.e., confined within the same edges). Alternatively or in addition, processing system 400 can estimate which sections of a curve correspond to true depth measurements (e.g., sections 2101, 2103, 2105, 2107) and which sections of a curve correspond to depth transitions (e.g., sections 2102, 2104, and 2106). Processing system 400 can then smoothen by only blending depths within (a) a common section or (b) within a common true depth section (but not a depth transition).

Figure 22:
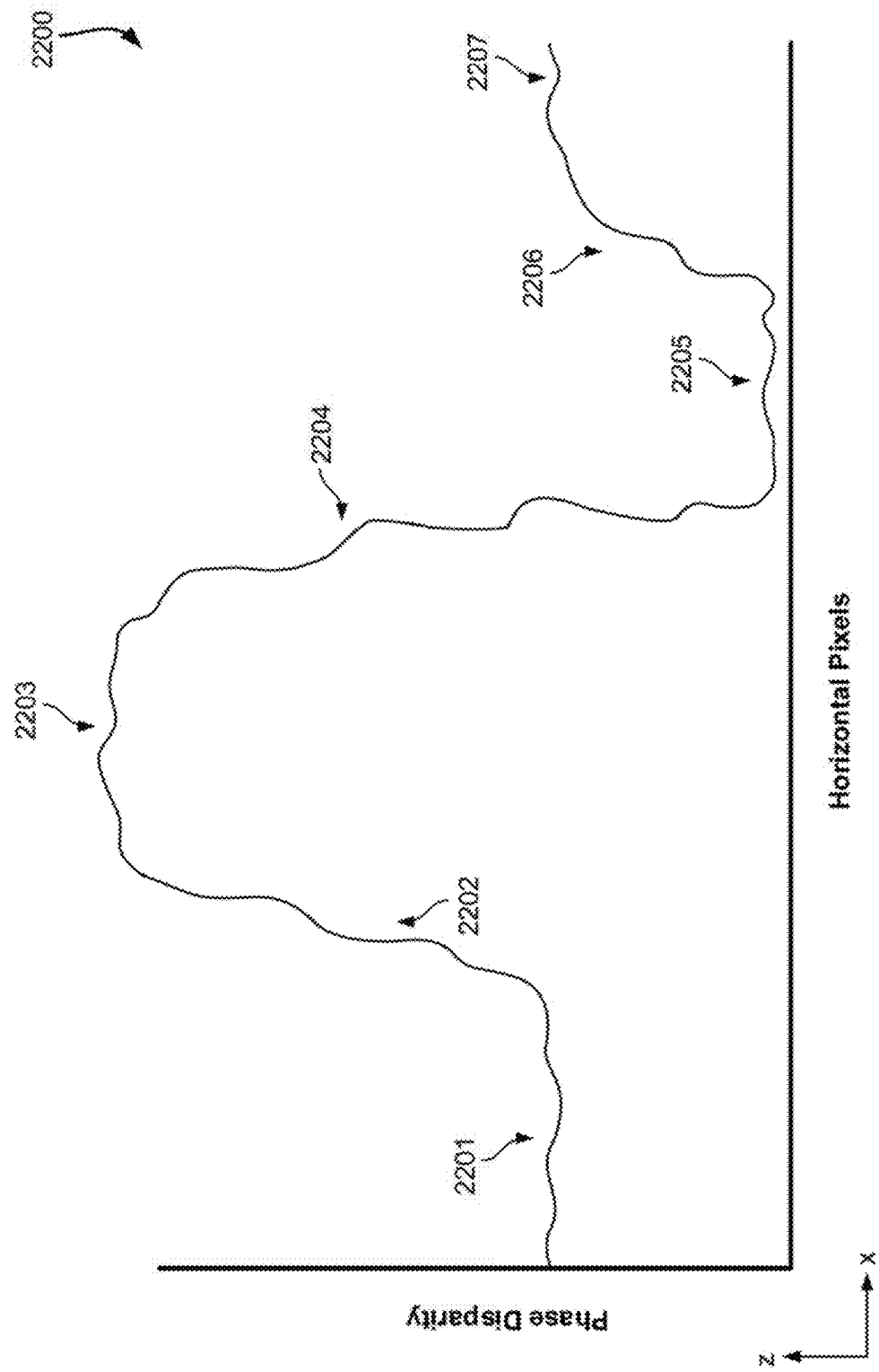
FIG. 22 shows an example smooth phase disparity curve taken along plane 21-21 of FIG. 19.

FIG. 22 shows an example smooth curve 2200. Smooth curve 2200 can be the result of low-pass filtering applied to raw (e.g., rough) curve 2100. Sections 2201-2207 respectively correspond to sections 2101-2107.

At block 1710, processing system 400 can pick a search strategy based on smoothened depth map 1900 and factors 1708. Factors 1708 can include information such as a location of camera 101 (e.g., whether camera 101 is a front facing camera such as camera 101*a* or a rear facing camera such as cameras 101*b*-101*d*; one or more lens positions (e.g., due to autofocus) inside camera 101; GPS coordinates of camera 101; etc.). The search strategy can include optical field (e.g., depth range) search order, as previously discussed. According to some examples, processing system 400 searches foreground for front facing cameras 101a first while processing system 400 searches field of focus for rear facing cameras 101b-101e first. According to some examples, processing system 400 always searches foreground first. Block 1710 can include any feature discussed with reference to block 1606.

Figure 23:
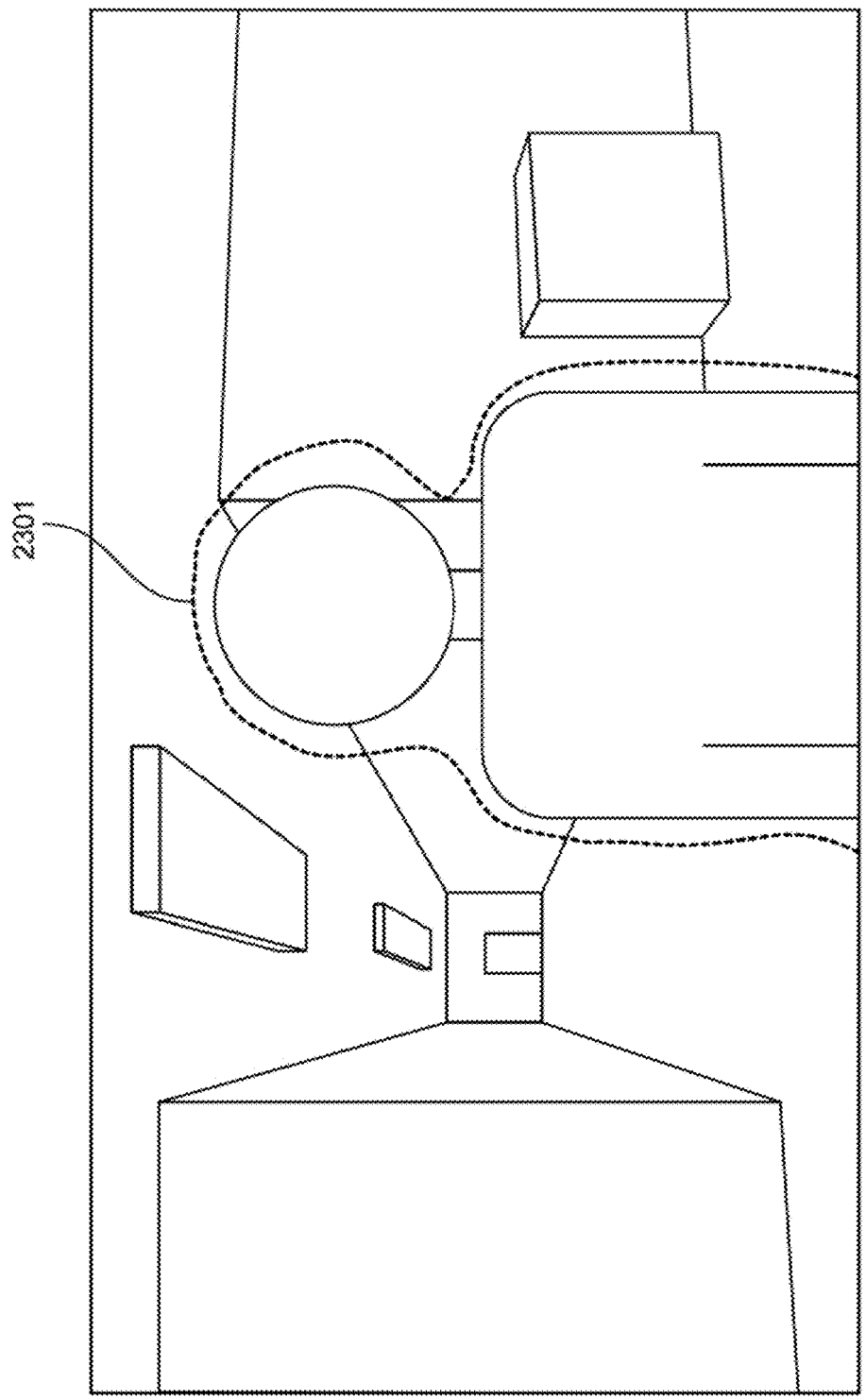
FIG. 23 shows an example confined territory.

At block 1712, processing system 400 can identify a confined territory in the full-channel image based on the smoothened depth map. The confined territory can be the portion of full-channel image corresponding to a desired optical field (e.g., depth range). In FIG. 23, processing system 400 has identified confined territory 2301 with an irregular non-rectangular perimeter. If processing system 400 identifies more than one confined territory at block 1712, processing system 400 can return to block 1706 and further smoothen depth map 1900 and/or smoothen depth map 1900 with a different technique (e.g., a different low pass filter). Block 1712 can include any feature discussed with reference to block 1606.

At block 1714, processing system 400 can expand confined territory 2301 into a regular geometrical shape (e.g., a rectangle). Block 1714 can include any feature discussed with reference to blocks 1606-1608. Processing system 400 can expand confined territory 2301 to encompass the entire confined territory 2301. Processing system 400 can expand confined territory to encompass at least a predetermined buffer on each side of the section in depth map 1900 corresponding to confined territory 2301 (where such a buffer is possible, given that a closed confined territory can intersect edges of the full-channel image as shown in FIG. 23).

The predetermined buffer can be based on transitions in smoothened depth map 1900 away from the desired depth range. The predetermined buffer can be set to encompass each transition in smoothened depth map 1900 touching the section in depth map 1900 corresponding to confined territory. For example, processing system 400 can expand confined territory to encompass smoothened section 2205 (corresponding to person 1850) and transitions 2204, 2206 on either side of section 2205. Processing system 400 can apply the buffer such that no point on the closed outer perimeter of the confined territory intersects the closed outer perimeter of the expanded territory, except in spots where the confined territory intersects image edges (see FIG. 23).

When creating the expanded territory, processing system 400 can remove any inner edges or perimeters within the confined territory. For example, if the confined territory is donut-shaped (with a center corresponding to an undesired optical field), processing system 400 can remove the inner edges of the confined territory defining the center such that the undesired optical field is included in the expanded territory. Thus, territory expansion can include inward expansion in addition to outward expansion.

Figure 24:
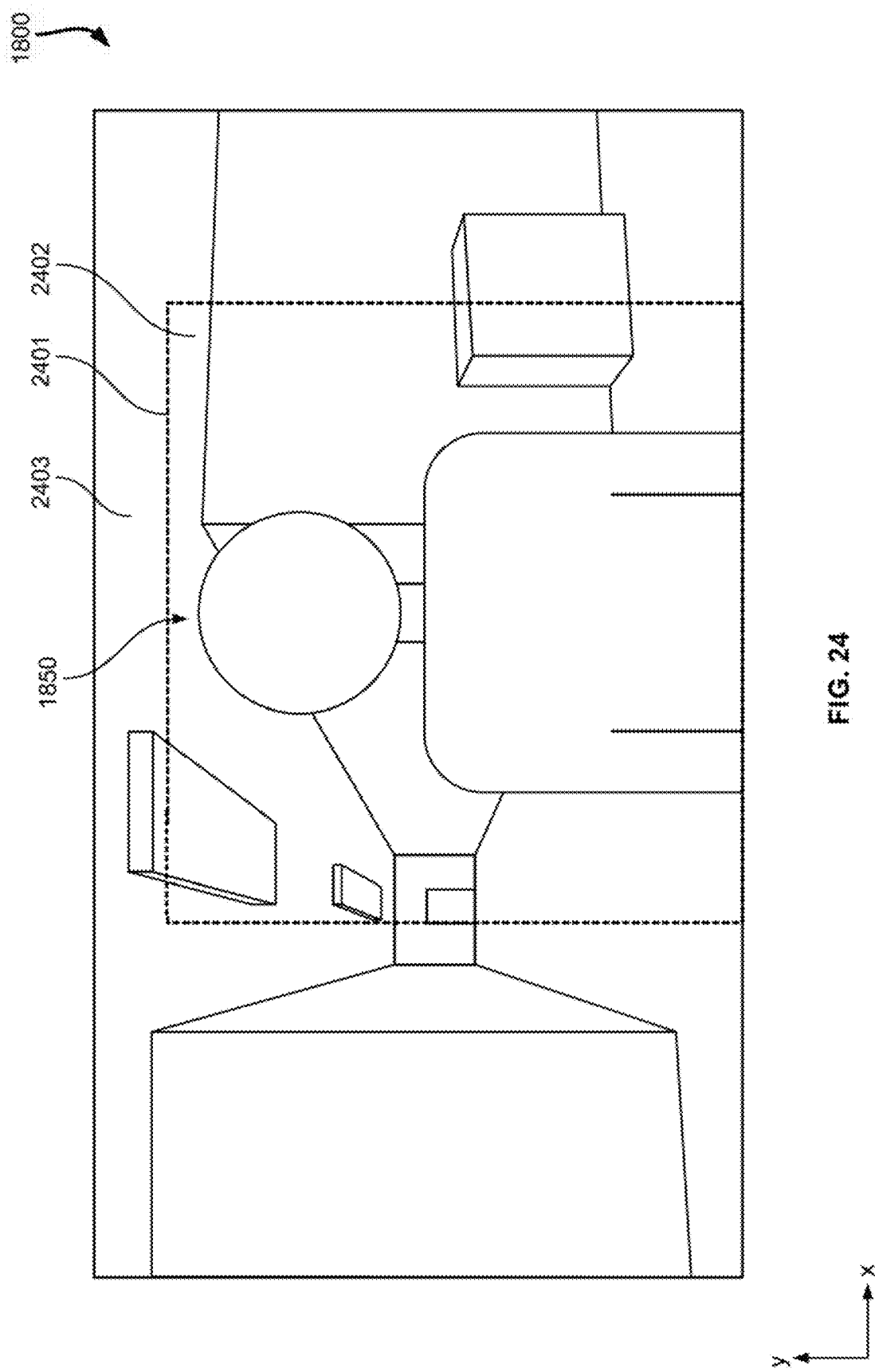
FIG. 24 shows an example of an expanded territory.

FIG. 24 shows an example expanded territory 2401. Expanded territory 2401 encompasses full-channel image area 2402. Expanded territory 2401 does not encompass full-channel image area 2403. Expanded territory 2401 is a closed rectangle.

At block 1716, processing system 400 can select a neighborhood (NBH) size for the expanded territory. Block 1716 can include any feature discussed with reference to block 1606-1608. At block 1716, processing system 400 can set a minimum neighborhood size and a maximum neighborhood size using any of the above-disclosed techniques. The minimum neighborhood size and/or the maximum neighborhood size can be based on (a) a total area of the expanded territory, (b) a total area of the confined territory, (c) a depth (e.g., depth range) of the portion of full-channel image within the expanded territory, (d) a depth (e.g., depth range) of the portion of full-channel image within the confined territory, and/or (e) calibration parameters of camera 101. The various factors that can influence minimum and/or maximum neighborhood size are discussed above.

Figure 25:
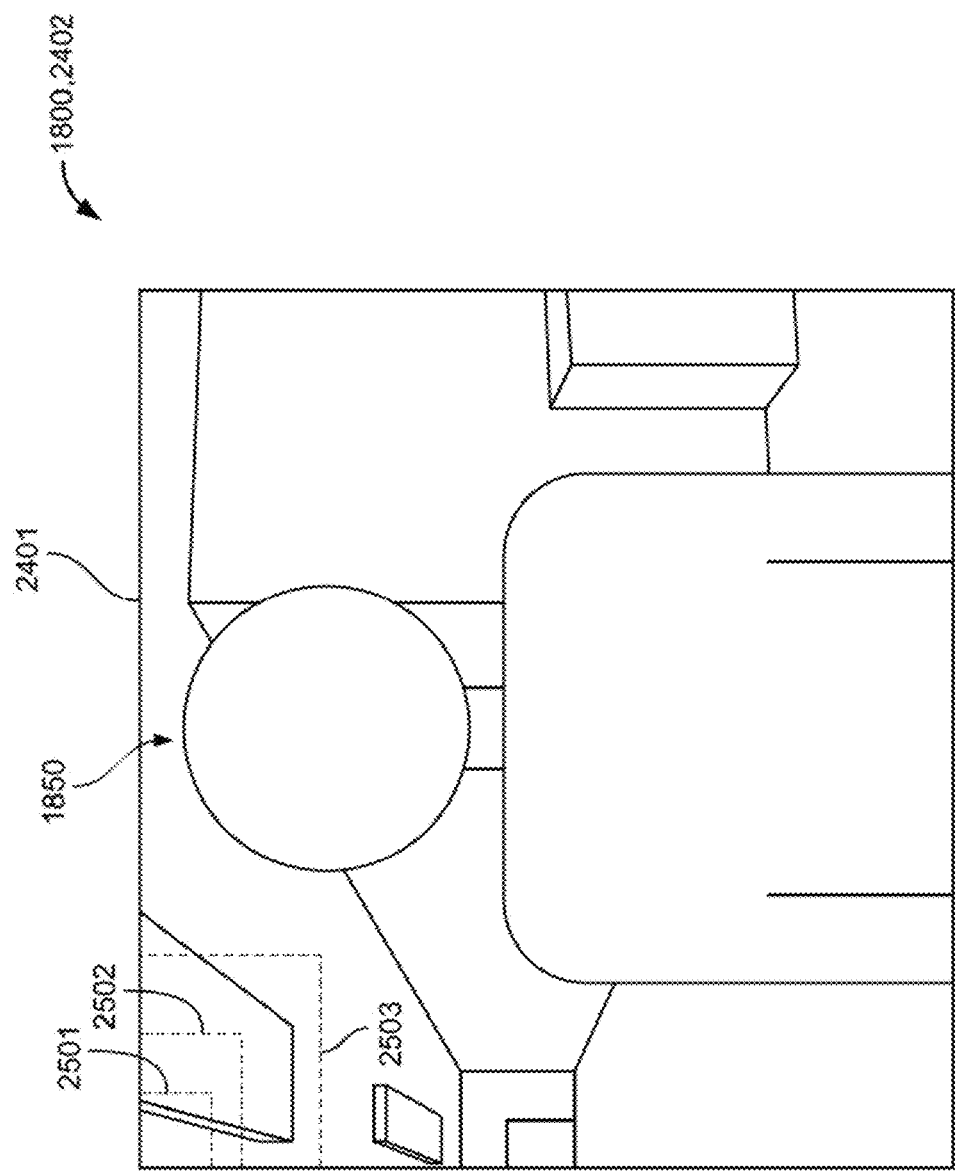
FIG. 25 shows an example of the area within the expanded territory and various sized neighborhoods.

FIG. 25 shows three example neighborhoods 2501-2503. First neighborhood 2501 can be the minimum sized neighborhood. Second neighborhood 2502 can be an intermediate sized neighborhood. Third neighborhood 2503 can be the maximum sized neighborhood. Third neighborhood 2503 can be applied first and first neighborhood 2501 can be applied last. Given the relative size of head/face 1851 to the neighborhoods, third neighborhood 2503 may be more likely than first and second neighborhoods 2501, 2502 to detect head/face 1851.

At block 1718, processing system 400 can sweep a neighborhood over the expanded territory as previously discussed with reference to FIG. 27. Block 1718 can include any features discussed with reference to blocks 1608 and 1614. For example, processing system 400 can check, during block 1718, whether a sufficient number of real objects (e.g., at least one human face) have been detected with at least a predetermined confidence. If so, processing system 400 can conclude the search and skip to block 1722.

At block 1720, processing system 400 can check if end conditions have been satisfied. Block 1720 can include any features discussed with reference to blocks 1610-1614. Block 1720 can occur after each application of the selected neighborhood. If end conditions have been satisfied (e.g., each territory has been fully searched and/or a predetermined number of desired features (e.g., human faces) have been identified, processing system 400 can proceed to block 1722.

Block 1722 can include any features discussed with reference to block 1612. The search of FIGS. 16 and/or 17 can be performed with a software routine. When an end occurs at block 1612 and/or block 1722, processing system 400 can terminate the software routine by clearing the same from registers (e.g., cache) associated with processor(s) 401 of processing system 400.

If the end conditions have not been satisfied at block 1720, processing system 400 can iterate by returning to block 1712 or block 1716. Iteration can include any features discussed with reference to block 1614. During block 1720, processing system 400 can check whether any other neighborhoods should be applied to the expanded territory. If further neighborhoods should be applied, then processing system 400 can return to block 1716 and apply the next neighborhood. Processing system 400 can cycle through blocks 1716, 1718, and 1720 until the maximum through minimum sized neighborhoods have been applied to the expanded territory.

When each neighborhood has been applied to a territory, processing system 400 can determine whether any additional territories should be searched consistent with the search order selected at block 1710. For example, the search order can dictate that depth ranges/optical fields 2201 and 2207 be searched next. Processing system 400 can decline to re-smoothen the depth map when returning to block 1712 after block 1720. Block 1720 can include any features discussed with reference to blocks 1610-1614.

Figure 26:
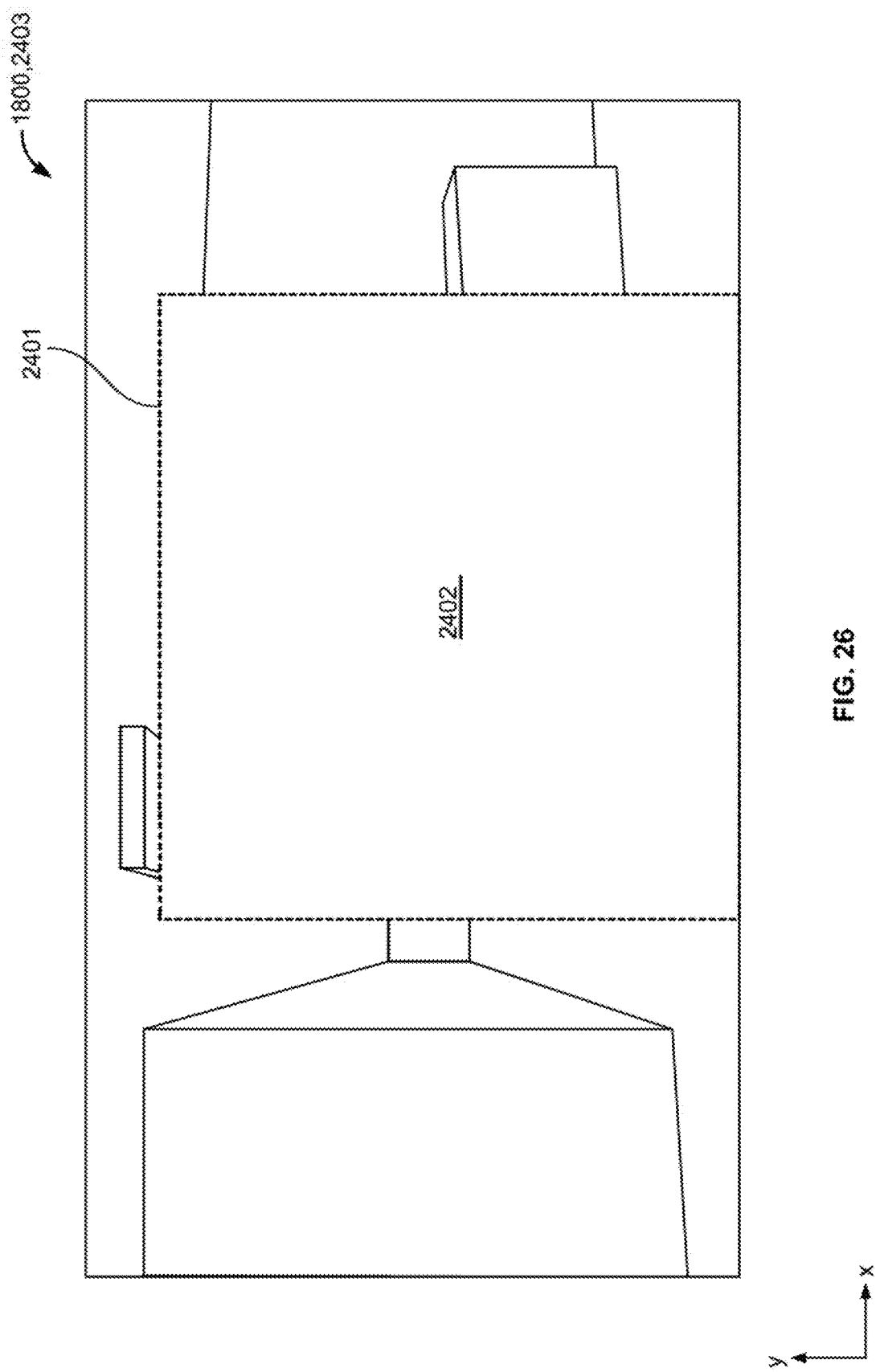
FIG. 26 shows an example of the area outside the expanded territory.

Processing system 400 can re-execute blocks 1712-1720 for the new territory (e.g., perform a new feature detection). Since sections 2201 and 2207 are discrete, processing system 400 can structure the expanded territory to encompass both dual confined territories 2201 and 2207. Referring to FIG. 26, processing system 400 can omit areas of full-channel image 2402 that have already been searched in the new expanded territory (here, area 2402). Alternatively, processing system 400 can include areas of full-channel image that have already been searched in the new expanded territory.

As previously discussed, block 1710 can result in a territory search order. At block 1710, processing system 400 can begin by selecting a plurality of different depth ranges based on the smoothened depth map 1900. Processing system 400 can approximate what qualifies as foreground, field of focus, and/or background through the selection of depth ranges.

According to one strategy, processing system 400 (e.g., for a front-facing camera 101), can select, as a first depth range, all depths between the most negative phase disparity (inclusive) and an approximate zero phase disparity (inclusive). An approximate zero phase disparity can be computed with any suitable technique (e.g., processing system 400 can approximate any phase disparity within a predetermined range from zero as being an approximate zero phase disparity). Processing system 400 can determine what qualifies as foreground by first determining what qualifies as background. Similar techniques can be applied if field of focus 802 is distinct from foreground 801. In this case, processing system 400 can select depth ranges by determining what phase disparities qualify as (e.g., approximate) field of focus 802.

Instead of using phase-detection to select depth ranges, processing system 400 can rely on a 3D depth map produced with another technique (e.g., infrared rangefinding) and known mechanical properties of camera 101 (e.g., autofocus position, kind of lens used).

As previously discussed, depth ranges can be isolated or overlapping. For example, processing system 400 can exclusively use depth range 1910 to build a first confined territory, depth range 1920 to build a second confined territory, depth range 1930 to build a third confined territory, depth range 1940 to build a fourth confined territory, and depth range 1950 to build a fifth confined territory. Therefore, a first expanded territory can encompass depth range 1910, a second expanded territory can encompass depth range 1920, and so on.

Alternatively, processing system 400 can exclusively use depth range 1910 to build a first confined territory, depth ranges 1910 and 1920 to build a second confined territory, depth ranges 1910, 1920, and 1930 to build a third confined territory, and so on. Alternatively, processing system 400 can exclusively use depth range 1910 to build a first confined territory, depth ranges 1910 and 1920 to build a second confined territory, depth ranges 1920 and 1930 to build a third confined territory and so on. According to this strategy, each depth range is used to build two different territories.

X

Referring to FIG. 1, mobile device 100 can be a smartphone 100*a*, a tablet, a digital camera, or a laptop. Mobile device 100 can be a dedicated camera assembly 100*b*. Mobile device 100 can be mounted to a larger structure (e.g., a vehicle or a house). Mobile device 100 (or any other device, such as a vehicle or desktop computer) can include processing system 400.

Processing system 400 can be distributed across a network (e.g., the Internet). Processing system 400 can include remote modules configured to communicate across a network. Referring to FIG. 4, processing system 400 can include one or more processors 401, memory 402, one or more input/output devices 403, one or more sensors 404, one or more user interfaces 405, and one or more actuators 406.

Processors 401 can include one or more distinct processors, each having one or more cores. Each of the distinct processors can have the same or different structure. Processors 401 can include one or more central processing units (CPUs), one or more graphics processing units (GPUs), circuitry (e.g., application specific integrated circuits (ASICs)), digital signal processors (DSPs), and the like. Processors 401 can be mounted on a common substrate or to different substrates. Processors 401 can include circuitry of sensor panel 121. Processors 401 can cooperate in a distributed environment. For example, some processors 401 can be disposed within mobile device 100 while other processors 401 can be in an external server configured to communicate with mobile device 100.

Processors 401 are configured to perform a certain function, method, or operation at least when one of the one or more of the distinct processors is capable of executing code, stored on memory 402 embodying the function, method, or operation. Processors 401 can be configured to perform any and all functions, methods, and operations disclosed herein.

For example, when the present disclosure states that processing system 400 can perform task "X", such a statement should be understood to disclose that processing system 400 can be configured to perform task "X". Mobile device 100 and processing system 400 are configured to perform a function, method, or operation at least when processors 401 are configured to do the same.

Memory 402 can include volatile memory, non-volatile memory, and any other medium capable of storing data. Each of the volatile memory, non-volatile memory, and any other type of memory can include multiple different memory devices, located at multiple distinct locations and each having a different structure. Examples of memory 402 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described in the present application can be fully embodied in the form of tangible and/or non-transitory machine-readable code saved in memory 402.

Input-output devices 403 can include any component for trafficking data such as ports, antennas (i.e., transceivers), printed conductive paths, and the like. Input-output devices 403 can enable wired communication via USB®, DisplayPort®, HDMI®, Ethernet, and the like. Input-output devices 403 can enable electronic, optical, magnetic, and holographic, communication with suitable memory 402. Input-output devices can enable wireless communication via WiFi®, Bluetooth®, cellular (e.g., LTE®, CDMA®, GSM®, WiMax®, NFC®), GPS, and the like. Input-output devices 403 can include wired and/or wireless communication pathways.

Sensors 404 can capture physical measurements of environment and report the same to processors 401. Examples of sensors 404 include photodiodes and thermocouples. User interface 405 can include displays (e.g., LED touchscreens (e.g., OLED touchscreens), physical buttons, speakers, microphones, keyboards, and the like. User interface 405 can include display 102 and hard button 103. Actuators 406 can enable processors 401 to control mechanical forces. If camera 101 includes auto-focus, motors/actuators 406 can move a lens along its optical axis to provide auto-focus and/or perform optical image stabilization.

Processing system 400 can be modular. As shown, processing system 400 can include one or more central controllers 421, one or more transceiver modules 422, one or more cameras 101, one or more displays 102, non-volatile memory module(s) 423, and volatile memory module(s) 424. Each module can include one or more processors 401, one or more units of volatile memory 402, one or more units of non-volatile memory 402, one or more input-output devices 403, one or more sensors 404, one or more user interfaces 405, and one or more actuators 406. Input/output devices 403 can connect the modules as schematically shown via wired and/or wireless communication pathways. Any module can represent a plurality of discrete modules. For example, one non-volatile memory module 423 can include a solid-state memory 402 within mobile device 100. Another non-volatile module 423 can include cloud-storage 402 external to mobile device 100. Transceiver(s) 422 can include one or more modems enabling two-way wireless communication via one or more antennas.

Processing system 400 can include a plurality of other modules. Processing system 400 can include multiple instances of any module shown in FIG. 4. Processing system 400 can omit any module shown in FIG. 4. Processing system 400 can be confined within a single device (e.g., mobile device 100). Processing system 400 can be distributed (e.g., non-volatile memory module 423 can be disposed in a remote server and the other modules can be disposed in mobile device 100).

We claim:

1. A method comprising, via one or more processors:
   identifying, with a depth map, image pixels of an image having depth values intersecting a desired optical field;
   setting a territory based on locations of the identified image pixels; and
   performing feature detection on the image within the set territory, the feature detection being limited to the set territory.

2. The method of claim 1, wherein the territory is a first territory, wherein the desired optical field is a first desired optical field, and wherein the feature detection is a first feature detection, the method further comprising:
   identifying, with the depth map, image pixels having depth values intersecting a second desired optical field;
   setting a second territory based on locations of the identified image pixels having the depth values intersecting the second desired optical field; and
   performing a second feature detection on the image within the set second territory, the second feature detection being limited to the set second territory,
   the second desired optical field being different than the first desired optical field, the second desired optical field (a) comprising one or more depths in common with the first desired optical field or (b) excluding any depths in common with the first desired optical field.

3. The method of claim 1, wherein the desired optical field consists of image foreground, which the territory is centered about.

4. The method of claim 1, wherein the desired optical field excludes image background and the territory is centered about the desired optical field.

5. The method of claim 1, wherein the feature detection comprises:
   sweeping a plurality of neighborhoods over the territory, the plurality of neighborhoods comprising a smallest neighborhood and a largest neighborhood,
   the largest neighborhood having a size based on a size of the territory.

6. The method of claim 5, wherein the image pixels are first image pixels, wherein the image is a first image, and wherein the method further comprises:
   identifying, with a depth map, second image pixels of a second image having depth values intersecting a desired optical field;
   setting a territory based on locations of the identified second image pixels; and
   performing feature detection on the second image within the set second image territory, the second image feature detection being limited to the set second image territory and comprising:
      sweeping a plurality of neighborhoods over the second image territory, the plurality of second image neighborhoods comprising a smallest second image neighborhood and a largest second image neighborhood,
   the largest second image neighborhood being larger or smaller than the largest first image neighborhood, and
   the first image and the second image comprising an equal number of image pixels.

7. The method of claim 6, wherein the desired second image optical field is a depth range in between two predetermined depths such that one segment of the desired second image optical field maps to foreground and another different segment of the desired second image optical field maps to field of focus,
   the second image feature detection being an earlier second image feature detection, the smallest second image neighborhood being an earlier smallest second image neighborhood, the largest second image neighborhood being an earlier largest second image neighborhood, and the method further comprising:
      performing a later feature detection on the second image at least partially outside of the set second image territory immediately after concluding the earlier second image feature detection.

8. The method of claim 1, wherein the territory is an expanded territory, the method further comprising:
   setting a confined territory based on the locations of the identified image pixels; and
   setting the expanded territory by expanding the confined territory,
   the expanded territory having more image pixels outside the desired optical field than the confined territory, and
   both the expanded territory and the confined territory being centered about the desired optical field.

9. The method of claim 8, wherein the confined territory has an irregular outer perimeter and the expanded territory has a regular outer perimeter.

10. The method of claim 9, wherein the expanded territory has a rectangular outer perimeter and the confined territory is expanded accordingly.

11. The method of claim 9, wherein the expanded territory covers more image pixels than the confined territory, each image pixel in the confined territory being present in the expanded territory.

12. The method of claim 1, wherein the depth map is a successor depth map, the method further comprising:
smoothening a predecessor depth map to produce the successor depth map.

13. The method of claim 12, wherein smoothening the predecessor depth map comprises filtering the predecessor depth map at least until the desired optical field maps to a single contiguous region in the filtered predecessor depth map.

14. The method of claim 1, wherein the depth map is a successor depth map, the method further comprising:
producing the successor depth map by compressing a predecessor depth map such that the predecessor depth map has a finer resolution than the successor depth map.

15. The method of claim 14, wherein producing the successor depth map comprises smoothening the predecessor depth map, the smoothening occurring in sequence with the compressing such that (a) the predecessor depth map is compressed and then the compressed predecessor depth map is smoothened or (b) the predecessor depth map is smoothened and then the smoothened predecessor depth map is compressed.

16. The method of claim 1, wherein the image is a full-channel image, the method further comprising:
capturing an image mosaic with a plurality of phase detection pixels;
producing the full-channel image from the image mosaic; and
producing the depth map from the image mosaic.

17. The method of claim 1, wherein the feature detection is face detection.

18. The method of claim 1, wherein the territory is a first territory and the feature detection is a first feature detection, the method further comprising:
determining whether to perform a second feature detection on the image based on a quantity of real features detected during the first feature detection; and
declining to perform the second feature detection based on a determination that the quantity of real features detected during the first feature detection exceeds a predetermined quantity.

19. The method of claim 1, wherein the depth map is produced based on a plurality of phase detection pixels of the image.

20. A processing system comprising one or more processors configured to:
identify, with a depth map, image pixels of an image having depth values intersecting a desired optical field;
set a territory based on locations of the identified image pixels;
perform feature detection on the image within the set territory; and
limit the feature detection to the set territory.

21. The processing system of claim 20, wherein the desired optical field consists of image foreground, which the territory is centered about.

22. The processing system of claim 20, wherein the territory is an expanded territory and the one or more processors are further configured to:
set a confined territory based on the locations of the identified image pixels; and
expand the confined territory into the expanded territory such that (a) the expanded territory has more image pixels outside the desired optical field than the confined territory and (b) both the expanded territory and the confined territory are centered about the desired optical field.

23. The processing system of claim 22, wherein the confined territory has an irregular outer perimeter and the expanded territory has a regular outer perimeter.

24. The processing system of claim 20, wherein the depth map is a successor depth map and the one or more processors are further configured to smoothen a predecessor depth map to produce the successor depth map.

25. The processing system of claim 20, wherein the territory is a first territory and the feature detection is a first feature detection, the one or more processors are further configured to:
determine whether to perform a second feature detection on the image based on a quantity of real features detected during the first feature detection;
decline to perform the second feature detection based on a determination that the quantity of real features detected during the first feature detection exceeds a predetermined quantity; and
perform the second feature detection based on a determination that the quantity of real features detected during the first feature detection is less than the predetermined quantity.

26. A non-transitory computer-readable medium comprising program code, which, when executed by one or more processors, causes the one or more processors to perform operations, the program code comprising code for:
identifying, with a depth map, image pixels of an image having depth values intersecting a desired optical field;
setting a territory based on locations of the identified image pixels; and
performing feature detection on the image within the set territory, the feature detection being limited to the set territory.

* * * * *